US012273763B2

(12) United States Patent
Mach

(10) Patent No.: US 12,273,763 B2
(45) Date of Patent: Apr. 8, 2025

(54) METHOD AND APPARATUS FOR CONTROLLING LOADS ON NETWORKS

(71) Applicant: Samsung Electronics Co., Ltd., Suwon-si (KR)

(72) Inventor: Tomasz Mach, Staines (GB)

(73) Assignee: Samsung Electronics Co., Ltd., Suwon-si (KR)

( * ) Notice: Subject to any disclaimer, the term of this patent is extended or adjusted under 35 U.S.C. 154(b) by 589 days.

(21) Appl. No.: 17/594,829

(22) PCT Filed: Apr. 27, 2020

(86) PCT No.: PCT/KR2020/005530
§ 371 (c)(1),
(2) Date: Oct. 29, 2021

(87) PCT Pub. No.: WO2020/226315
PCT Pub. Date: Nov. 12, 2020

(65) Prior Publication Data
US 2022/0217568 A1    Jul. 7, 2022

(30) Foreign Application Priority Data
May 3, 2019 (GB) .................................. 1906329

(51) Int. Cl.
*H04W 28/02* (2009.01)
*H04W 4/40* (2018.01)
(Continued)

(52) U.S. Cl.
CPC ....... *H04W 28/0226* (2013.01); *H04W 24/10* (2013.01); *H04W 28/0284* (2013.01);
(Continued)

(58) Field of Classification Search
CPC ......... H04W 28/0226; H04W 28/0284; H04W 28/0289; H04W 28/06; H04W 36/03; H04W 24/10; H04W 4/30; H04W 4/40
See application file for complete search history.

(56) References Cited

U.S. PATENT DOCUMENTS 10,779,189 B2    9/2020 Khoryaev et al.
2016/0155333 A1   6/2016 Strassberger et al.
(Continued)

FOREIGN PATENT DOCUMENTS

EP    3253085 A1    12/2017
GB    2471287 A     12/2010
(Continued)

OTHER PUBLICATIONS

International Search Report and Written Opinion of the International Searching Authority in connection with International Application No. PCT/KR2020/005530 issued Aug. 7, 2020, 9 pages.
(Continued)

*Primary Examiner* — Kent Krueger

(57) ABSTRACT

The present disclosure relates to a communication method and system for converging a 5th-Generation (5G) communication system for supporting higher data rates beyond a 4th-Generation (4G) system with a technology for Internet of Things (IoT). The present disclosure may be applied to intelligent services based on the 5G communication technology and the IoT-related technology, such as smart home, smart building, smart city, smart car, connected car, health care, digital education, smart retail, security and safety services.
A method of controlling a network, for example a peer-to-peer network, comprising a set of user equipment, UE, devices, including a first UE, is described. The method comprises determining, for example by the first UE, a first channel load metric, for example a channel busy ratio, CBR,
(Continued)

of a set of channel load metrics of a first channel of a set of channels of the network; generating, by the first UE, a first message, for example a V2X message, of a set of messages according to the determined first channel load metric; and transmitting, by the first UE, the generated first message, optionally on the first channel. A network and a UE are also described.

16 Claims, 14 Drawing Sheets

(51) Int. Cl.
  *H04W 24/10* (2009.01)
  *H04W 28/06* (2009.01)
  *H04W 36/00* (2009.01)
(52) U.S. Cl.
  CPC ......... *H04W 28/06* (2013.01); *H04W 36/037* (2023.05); *H04W 4/40* (2018.02)

(56) References Cited

U.S. PATENT DOCUMENTS

| | | | |
|---|---|---|---|
| 2017/0367005 A1* | 12/2017 | Shi | H04L 67/12 |
| 2018/0184319 A1 | 6/2018 | Fong et al. | |
| 2018/0184442 A1 | 6/2018 | Bai et al. | |
| 2018/0365909 A1* | 12/2018 | Cheng | H04Q 9/00 |
| 2019/0294966 A1* | 9/2019 | Khan | H04W 4/40 |
| 2019/0339082 A1* | 11/2019 | Doig | G01C 21/3848 |
| 2020/0228946 A1* | 7/2020 | Hwang | H04W 4/40 |
| 2020/0359257 A1 | 11/2020 | Kim et al. | |
| 2020/0367096 A1* | 11/2020 | Hwang | H04W 74/0808 |
| 2020/0374053 A1* | 11/2020 | Hwang | H04W 4/40 |
| 2021/0067926 A1* | 3/2021 | Hwang | H04W 4/44 |
| 2022/0005353 A1* | 1/2022 | Hwang | H04W 4/40 |
| 2022/0103986 A1* | 3/2022 | Hwang | H04W 4/38 |
| 2022/0217513 A1* | 7/2022 | Back | H04W 92/10 |

FOREIGN PATENT DOCUMENTS

| | | |
|---|---|---|
| WO | 2017052690 A1 | 3/2017 |
| WO | 2019103322 A1 | 5/2019 |

OTHER PUBLICATIONS

Gani et al., "A Study of the Effectiveness of Message Content, Length, and Rate Control for Improving Map Accuracy in Automated Driving Systems", IEEE Transactions on Intelligent Transportation Systems, vol. 20, No. 2, Feb. 2019, 16 pages.

ETSI EN 302 637-2 V1.4.1, Intelligent Transport Systems (ITS); Vehicular Communications; Basic Set of Applications; Part 2: Specification of Cooperative Awareness Basic Service, Apr. 2, 2019, 45 pages.

Combined Search and Examination Report under Sections 17 and 18(3) issued Oct. 23, 2019, in connection with United Kingdom Patent Application No. GB1906329.6, 7 pages.

Examination Report under Section 18(3) dated Jul. 7, 2021, in connection with United Kingdom Patent Application No. GB1906329.6, 3 pages.

3GPP TS 22.186 V16.2.0 (Jun. 2019) 3rd Generation Partnership Project; Technical Specification Group Services and System Aspects; Enhancement of 3GPP support for V2X scenarios; Stage 1 (Release 16), 18 pages.

3GPP TR 22.886 V16.2.0 (Dec. 2018) 3rd Generation Partnership Project; Technical Specification Group Services and System Aspects; Study on enhancement of 3GPP Support for 5G V2X Services (Release 16), 76 pages.

ETSI TS 103 324 V0.0.22 (May 2021) Intelligent Transport System (ITS); Vehicular Communications; Basic Set of Applications; Specification of the Collective Perception Service, 44 pages.

ETSI TR 103 562 V2.1.1 (Dec. 2019) Intelligent Transport Systems (ITS); Vehicular Communications; Basic Set of Applications; Analysis of the Collective Perception Service (CPS); Release 2, 119 pages.

ETSI EN 302 665 V1.1.1 (Sep. 2010) European Standard (Telecommunications series) Intelligent Transport Systems (ITS); Communications Architecture, 44 pages.

Final Draft—ETSI EN 302 637-2 V1.3.1 (Sep. 2014) Intelligent Transport Systems (ITS); Vehicular Communications; Basic Set of Applications; Part 2: Specification of Cooperative Awareness Basic Service, 44 pages.

SAE International, "(R) Dedicated Short Range Communications (DSRC) Message Set Dictionary" SAE J2735, Nov. 19, 2009, 2 pages.

3GPP TS 36.214 V16.2.0 (Mar. 2021), Technical Specification, 3rd Generation Partnership Project; Technical Specification Group Radio Access Network; Evolved Universal Terrestrial Radio Access (E-UTRA); Physical layer; Measurements (Release 16), 26 pages.

ETSI TS 102 687 V1.2.1 (Apr. 2018) Intelligent Transport Systems (ITS); Decentralized Congestion Control Mechanisms for Intelligent Transport Systems operating in the 5 GHz range; Access layer part, 14 pages.

* cited by examiner

FIG. 7
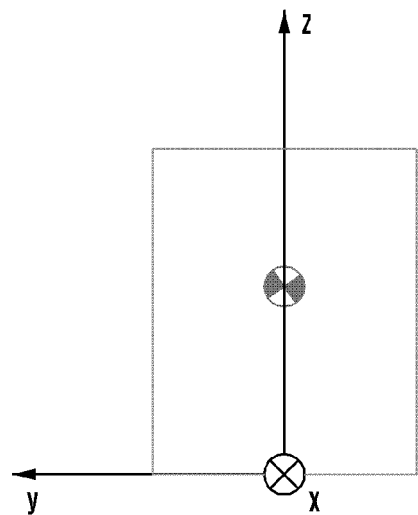
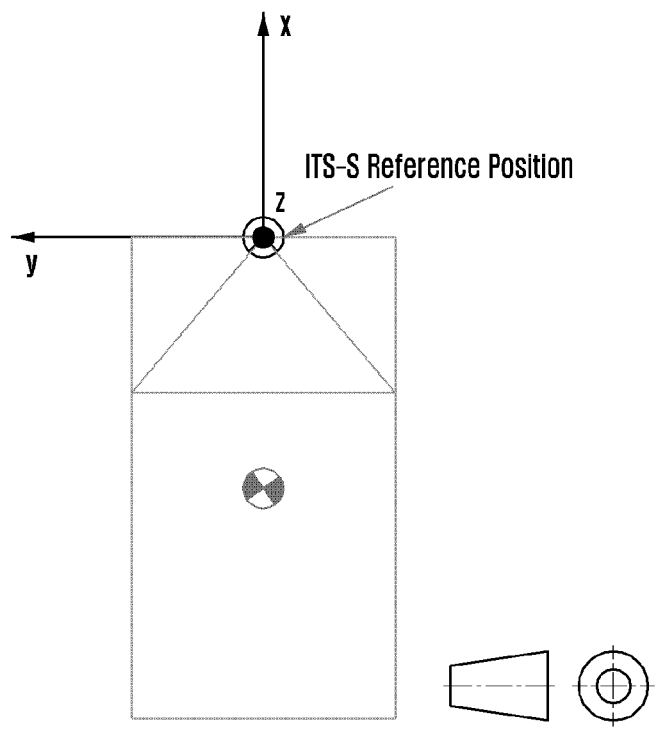

METHOD AND APPARATUS FOR CONTROLLING LOADS ON NETWORKS

CROSS-REFERENCE TO RELATED APPLICATIONS

This application is a 371 of International Application No. PCT/KR2020/005530, filed Apr. 27, 2020, which claims priority to United Kingdom Patent Application No. 1906329.6, filed May 3, 2019, the disclosures of which are herein incorporated by reference in their entirety.

BACKGROUND

1. Field

The present invention relates to networks comprising user equipment (UE) devices and to methods of controlling such networks. In particular, the present invention relates to controlling loads on the networks.

2. Description of Related Art

To meet the demand for wireless data traffic having increased since deployment of 4G communication systems, efforts have been made to develop an improved 5G or pre-5G communication system. Therefore, the 5G or pre-5G communication system is also called a 'Beyond 4G Network' or a 'Post LTE System'. The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems. In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like. In the 5G system, Hybrid FSK and QAM Modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The Internet, which is a human centered connectivity network where humans generate and consume information, is now evolving to the Internet of Things (IoT) where distributed entities, such as things, exchange and process information without human intervention. The Internet of Everything (IoE), which is a combination of the IoT technology and the Big Data processing technology through connection with a cloud server, has emerged. As technology elements, such as "sensing technology", "wired/wireless communication and network infrastructure", "service interface technology", and "Security technology" have been demanded for IoT implementation, a sensor network, a Machine-to-Machine (M2M) communication, Machine Type Communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing Information Technology (IT) and various industrial applications.

In line with this, various attempts have been made to apply 5G communication systems to IoT networks. For example, technologies such as a sensor network, Machine Type Communication (MTC), and Machine-to-Machine (M2M) communication may be implemented by beamforming, MIMO, and array antennas. Application of a cloud Radio Access Network (RAN) as the above-described Big Data processing technology may also be considered to be as an example of convergence between the 5G technology and the IoT technology.

SUMMARY

Generally, Cooperative Intelligent Transport Systems (C-ITS) supports vehicle safety applications, including driving awareness, driver warning and/or driver assistance, as well as other applications, including infotainment, for example. C-ITS is intended to be technology agnostic and hence, in principle, may use any mode of cellular communication or peer to peer communication. Vehicle to Everything Communication (V2X), including Vehicle to Vehicle (V2V), Vehicle to Infrastructure (V2I), Vehicle to Network (V2N) and Vehicle to Pedestrian (V2P) is typically used in C-ITS.

However, performance, reliability and/or usability of the communication, as defined by a Quality of Service (QoS), may be critical for ensuring, maintaining and/or enhancing safety. Hence, changes to the QoS may adversely compromise safety.

Hence, there is a need to mitigate changes to the QoS, so as to ensure, maintain and/or enhance safety, particularly in C-ITS using V2X communication.

It is one aim of the present invention, amongst others, to provide a method of controlling a network, preferably a peer-to-peer network, which at least partially obviates or mitigates at least some of the disadvantages of the prior art, whether identified herein or elsewhere. For example, the present invention may provide a method of controlling load on the network, so as so mitigate changes to the QoS, so as to ensure, maintain and/or enhance safety, particularly in C-ITS using V2X communication.

A first aspect provides method of controlling a network, for example a peer-to-peer network, comprising a set of user equipment, UE, devices, including a first UE, the method comprising:
  determining, for example by the first UE, a first channel load metric, for example a channel busy ratio, CBR, of a set of channel load metrics of a first channel of a set of channels of the network;
  generating, by the first UE, a first message, for example a V2X message, of a set of messages according to the determined first channel load metric; and
  transmitting, by the first UE, the generated first message, optionally on the first channel.

A second aspect provides a network, for example a peer-to-peer network or a cellular network, comprising a set of user equipment, UE, devices, including a first UE;
  wherein the first UE is arranged to:

determine a first channel load metric, for example a channel busy ratio, CBR, of a set of channel load metrics of a first channel of a set of channels of the network;

generate a first message, for example a V2X message, of a set of messages according to the determined first channel load metric; and transmit, by the first UE, the generated first message, optionally on the first channel.

A third aspect provides a user equipment, UE, device arranged to:

determine a first channel load metric, for example a channel busy ratio, CBR, of a set of channel load metrics of a first channel of a set of channels of the network;

generate a first message, for example a V2X message, of a set of messages according to the determined first channel load metric; and transmit, by the first UE, the generated first message, optionally on the first channel.

A fourth aspect provides a tangible non-transient computer-readable storage medium having recorded thereon instructions which when implemented by a user equipment, UE, device, cause the UE device to perform a method of controlling a network, preferably a peer-to-peer network, the method according to the first aspect.

BRIEF DESCRIPTION OF THE DRAWINGS

According to the present invention there is provided a method, a network, a user equipment (UE) device and a tangible non-transient computer-readable storage medium, as set forth in the appended claims.

FIG. 7 schematically depicts a coordinate system to be used for vehicle as disseminating ITS-S;

DETAILED DESCRIPTION

Figure 1:
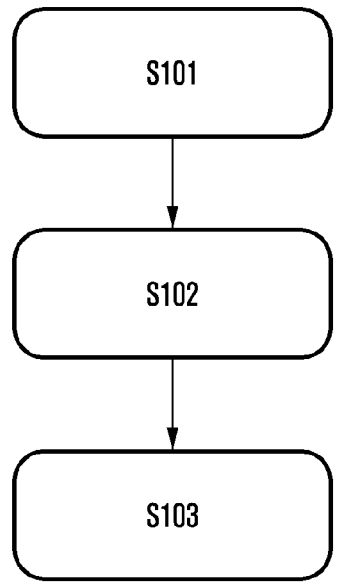
FIG. 1 schematically depicts a method of controlling a network according to an exemplary embodiment.

Generally, Cooperative Intelligent Transport Systems (C-ITS) supports vehicle safety applications, including driving awareness, driver warning and/or driver assistance, as well as other applications, including infotainment, for example. C-ITS is intended to be technology agnostic and hence, in principle, may use any mode of cellular communication or peer to peer communication. Vehicle to Everything Communication (V2X), including Vehicle to Vehicle (V2V), Vehicle to Infrastructure (V2I), Vehicle to Network (V2N) and Vehicle to Pedestrian (V2P) is typically used in C-ITS.

However, performance, reliability and/or usability of the communication, as defined by a Quality of Service (QoS), may be critical for ensuring, maintaining and/or enhancing safety. Hence, changes to the QoS may adversely compromise safety.

Hence, there is a need to mitigate changes to the QoS, so as to ensure, maintain and/or enhance safety, particularly in C-ITS using V2X communication.

It is one aim of the present invention, amongst others, to provide a method of controlling a network, preferably a peer-to-peer network, which at least partially obviates or mitigates at least some of the disadvantages of the prior art, whether identified herein or elsewhere. For example, the present invention may provide a method of controlling load on the network, so as so mitigate changes to the QoS, so as to ensure, maintain and/or enhance safety, particularly in C-ITS using V2X communication.

A first aspect provides method of controlling a network, for example a peer-to-peer network, comprising a set of user equipment, UE, devices, including a first UE, the method comprising:

determining, for example by the first UE, a first channel load metric, for example a channel busy ratio, CBR, of a set of channel load metrics of a first channel of a set of channels of the network;

generating, by the first UE, a first message, for example a V2X message, of a set of messages according to the determined first channel load metric; and transmitting, by the first UE, the generated first message, optionally on the first channel.

A second aspect provides a network, for example a peer-to-peer network or a cellular network, comprising a set of user equipment, UE, devices, including a first UE;

wherein the first UE is arranged to:

determine a first channel load metric, for example a channel busy ratio, CBR, of a set of channel load metrics of a first channel of a set of channels of the network;

generate a first message, for example a V2X message, of a set of messages according to the determined first channel load metric; and transmit, by the first UE, the generated first message, optionally on the first channel.

A third aspect provides a user equipment, UE, device arranged to:

determine a first channel load metric, for example a channel busy ratio, CBR, of a set of channel load metrics of a first channel of a set of channels of the network;

generate a first message, for example a V2X message, of a set of messages according to the determined first channel load metric; and transmit, by the first UE, the generated first message, optionally on the first channel.

A fourth aspect provides a tangible non-transient computer-readable storage medium having recorded thereon instructions which when implemented by a user equipment, UE, device, cause the UE device to perform a method of controlling a network, preferably a peer-to-peer network, the method according to the first aspect.

According to the present invention there is provided a method, a network, a user equipment (UE) device and a tangible non-transient computer-readable storage medium, as set forth in the appended claims. Other features of the invention will be apparent from the dependent claims, and the description that follows.

Method

The first aspect provides method of controlling a network, for example a peer-to-peer network, comprising a set of user equipment, UE, devices, including a first UE, the method comprising:

determining, for example by the first UE, a first channel load metric, for example a channel busy ratio, CBR, of a set of channel load metrics of a first channel of a set of channels of the network;

generating, by the first UE, a first message, for example a V2X message, of a set of messages according to the determined first channel load metric; and transmitting, by the first UE, the generated first message, optionally on the first channel.

In this way, method controls load on the network, so as so mitigate changes to the QoS, so as to ensure, maintain and/or enhance safety, particularly in C-ITS using V2X communication, because the first message is generated according to the first channel load metric. For example, if the first channel load metric is relatively high, the first message may be adapted (such as a size thereof restricted) so as to attenuate an increase in the first channel load metric due to transmission of the first message, for example on the same first channel. For example, if the first channel load metric is relatively high, transmission of the first message may be deferred or denied, so as to attenuate an increase in the first channel load metric due to transmission of the first message, for example on the same first channel. In contrast, for example, if the first channel load metric is relatively low, the first message may be augmented (such as such as to include additional content) so as to enhance safety. For example, if the first channel load metric is relatively low, the first message may be repeated, so as to enhance safety.

Generally, Cooperative Intelligent Transport Systems (C-ITS) (also known as 'connected vehicles') allow vehicles to communicate with other vehicles and infrastructure, such as traffic signals, that are fitted with the same system.

One of the challenges with sensor sharing applications for V2X is the amount of generated data which needs to be shared with the surrounding vehicles by using V2X radio communications. It needs to be controlled to make sure the radio resources used are not congested. The method according to the first aspect provides a solution of how to control radio channel load in V2X sensor sharing application.

Particularly, the method according to the first aspect may control V2X message size (by including and/or excluding sensor information or perceived object containers) based on radio channel occupancy level in a dynamic manner. As a result, the method allows to better adjust the number of the reported perceived objects in the Cooperative Perception Message and optimize system behaviour (message size) to address the dynamic V2X channel conditions and proactively avoid congestion for safety ITS services.

The method according to the first aspect applies to the Vehicle to Everything Communication (V2X) which may include Vehicle to Vehicle (V2V), Vehicle to Infrastructure (V2I), Vehicle to Network (V2N), Vehicle to Pedestrian (V2P). This type of communication is typically used in Cooperative Intelligent Transport Systems (C-ITS) to support C-ITS safety applications (e.g. driving awareness, warning, assistance). In general, C-ITS applications are designed to be technology agnostic and as a result, the communication could take place via any supporting radio communication technology employed for V2X. However, depending on the type of connection and its architecture there are two communication modes defined for V2X, namely Direct V2X Communication—Typically used for short range (e.g. up to 500 m). It could be either based on IEEE 802.11p standard in US (similar to Wi-Fi technology but extended to vehicles) sometimes called DSRC or ETSI ITS-G5 in EU. More recently new Cellular V2X (C-V2X) technology based on 3GPP LTE Rel-14 standard using LTE PC5 (aka sidelink) interface is also used (5G New Radio PC5 in the future). Due to the direct radio link between two V2X devices and a short communication range, this mode is typically more suitable for road safety applications requiring low latency and high reliability radio communication.

Indirect V2X Communication—Typically used for longer range. It can be based on cellular 3GPP Long Term Evolution (LTE) Rel-14 standard using C-V2X Uu radio interface or future 5G New Radio based interface, etc. By leveraging coverage of mobile network infrastructure, the communication range may be significantly extended beyond 500 m. Because the mobile network elements are communication intermediary between the communicating objects it is sometimes called V2N2V (Vehicle to Network to Vehicle) or V2N2P (Vehicle to Network to Pedestrian) etc. The indirect V2X communication mode requires mobile network coverage and is typically more suitable to C-ITS applications with less stringent latency requirements.

V2X technology typically uses radio communication technology to broadcast periodic (typically 1-10 Hz) messages (ETSI Cooperative Awareness Messages (CAM) or SAE Basic Safety Messages (BSM)) including safety critical or operational information (e.g. vehicle type, speed, location, acceleration, heading, physical vehicle parameters) to support C-ITS applications; avoid car crashes, improve transport efficiency and comfort (driving assistance) or support cooperative driving (i.e. vehicle platooning). This is achieved by tracking neighbouring vehicle location and its updates based on the periodically received CAM (generated in the Facilities Layer of the ETSI ITS-S protocol stack) or BSM messages in the receiving V2X system and is especially beneficial in scenarios where direct visibility is obstructed by physical objects. In addition, a combination of input from other integrated vehicle sensors (aka sensor fusion) may be also used i.e. camera, RADAR, LIDAR to support identification of various road objects in Local Dynamic Map to support Advanced Driver-Assistance Systems (ADAS) in the vehicle and higher levels of automomous driving in the future (level 0-5 as defined in SAE International standard). Such sensors however may have limited detection capability due to limited range, need for direct visibility (e.g. LIDAR) or reduced performance in bad weather conditions (e.g. camera).

It is expected that future connected vehicles will include V2X capabilities (HW and SW) to support both direct and indirect V2X communication modes [4] as they may be complementary. In practical V2X device implementation, this hybrid communication capabilities allow leveraging availability of both communication modes (and related radio access interfaces) independently to dynamically choose the mode more suitable to the supported C-ITS application and its communication context.

V2X industry defined sensor sharing (aka extended sensors) as one of the advanced safety features to be supported in future generations of Cooperative Intelligent Transport Systems (ITS) and 5G.

Extended Sensors enable the exchange of processed data gathered through local vehicle sensors e.g. camera, RADAR or LIDAR. As a result, the vehicles can enhance the perception of their environment beyond what their own sensors can detect and have a more holistic view of the local situation increasing road safety.

Collective Perception Messages (CPM) (see ETSI TS 103 324) are exchanged in the ITS network between ITS stations (ITS-S) to create a collective perception of road users and other objects that have been detected and recognized by ITS-Ss as road users or objects not equipped with an ITS-S. CPM structure is presented in FIG. 2.

Whenever an object is detected by a disseminating ITS-S a Perceived Object Container shall be added to the CPM. The container enables a detailed description of the dynamic state and properties of a detected object. The information regarding the location and dynamic state of the perceived object are provided in a coordinate system.

Figure 10:
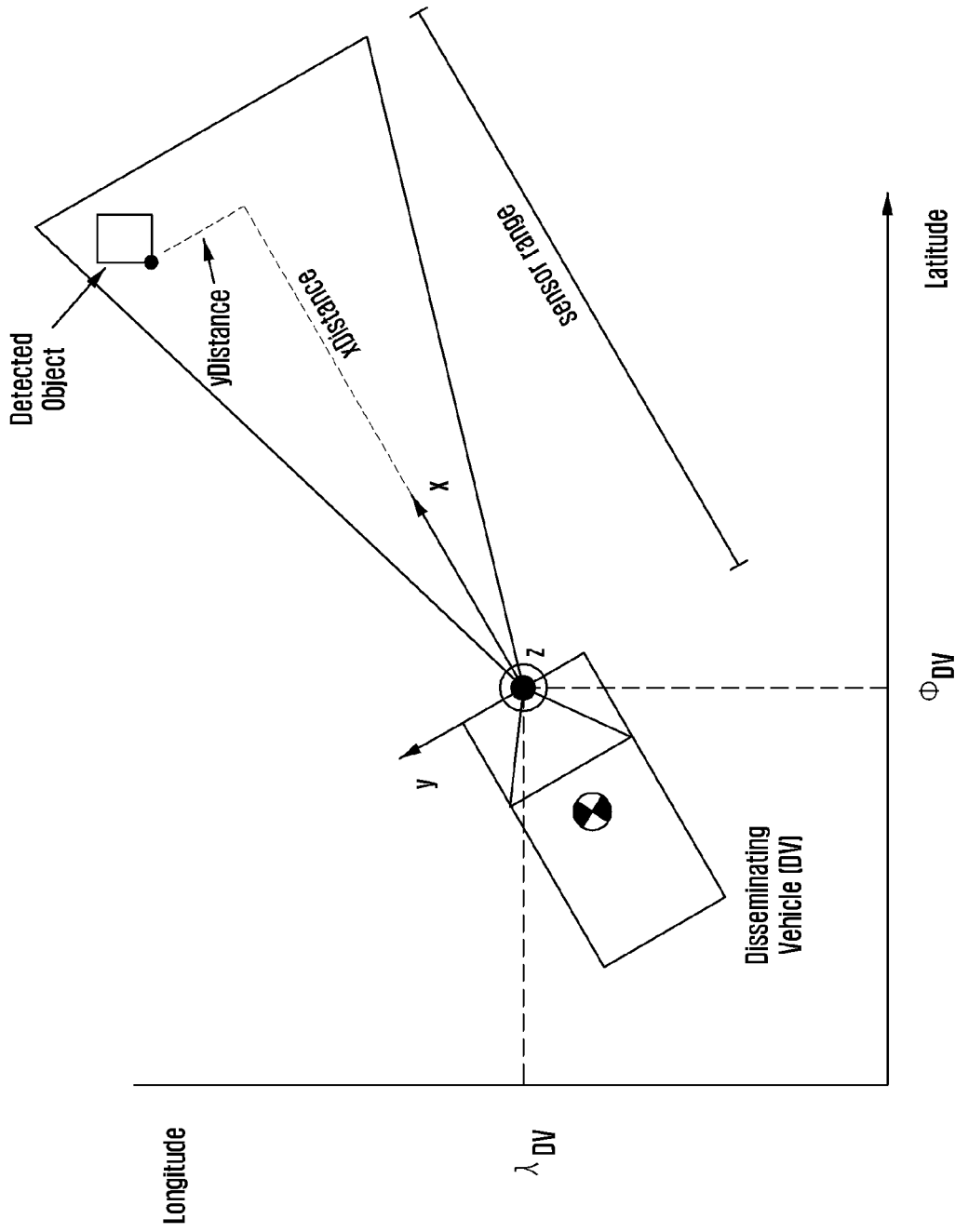
FIG. 10 schematically depicts a coordinate system for detected object for vehicle in disseminating ITS-S.

Every object has to be described by at least providing the distance and speed in the x/y plane of the respective coordinate system with respect to a station's reference point, as depicted in FIG. 10 for the case of a vehicle as disseminating ITS-S. The reference point of a measurement is also provided as part of the message.

Figure 6:
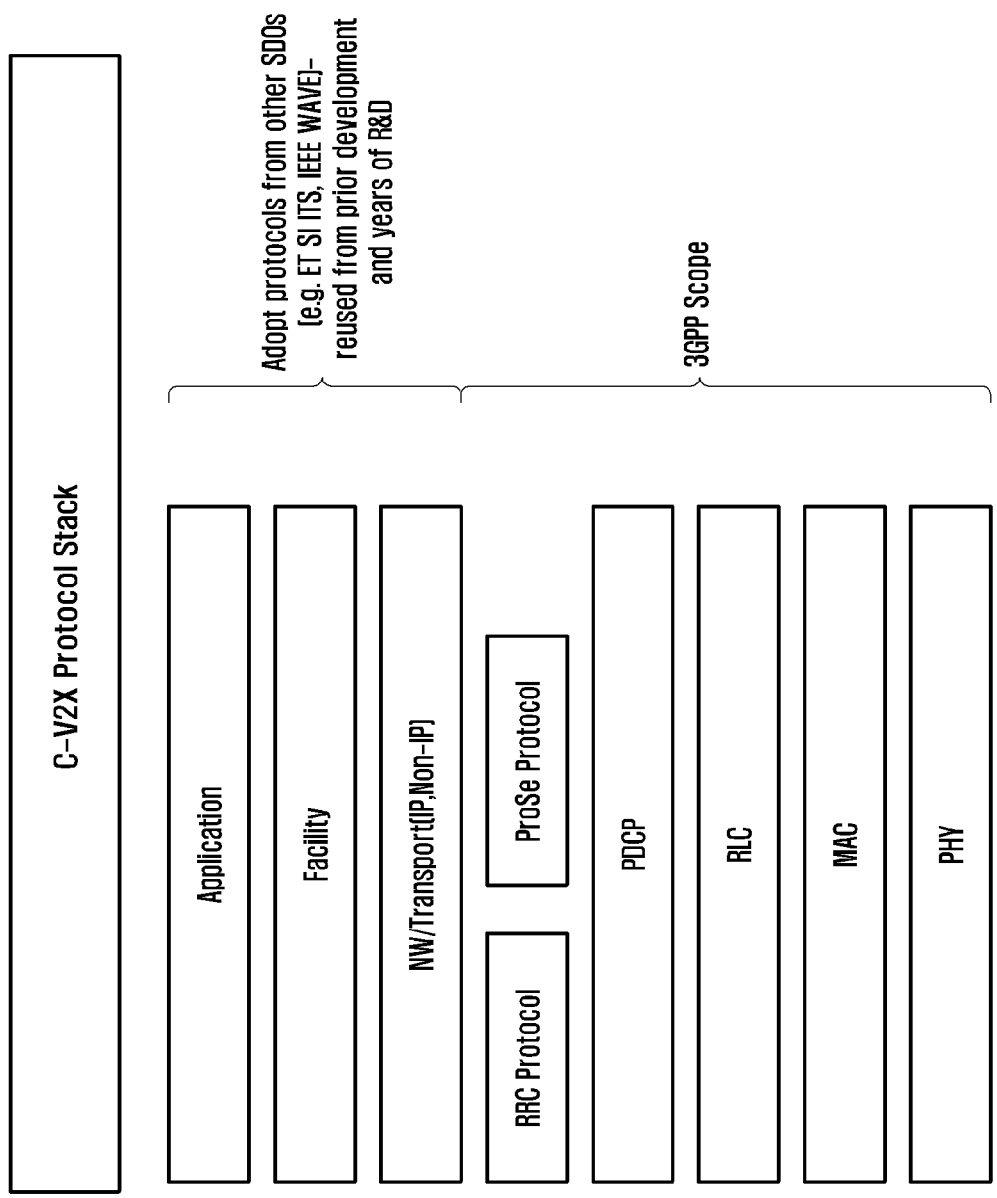
FIG. 6 schematically depicts a C-V2X protocol stack.

CPMs are generated periodically with a rate controlled by the Collective Perception service in the originating ITS-S. The generation frequency is determined taking into account the dynamic behaviour of the detected object status, e.g. change of position, speed or direction, sending of CPMs for the same (perceived) object by another ITS-S, as well as the radio channel load as determined by Decentralised Congestion Control (DCC) (ETSI TS 102 687 V1.2.1). To control radio channel load, DCC currently uses locally measured Channel Busy Ratio (CBR) for ITS-G5 and uses transmit power control, transmit rate control or transmit data rate control. CBR is defined as time-dependent value between zero and one representing the fraction of time that a single radio channel is busy with transmissions. CBR is also separately defined for 3GPP C-V2X (C-V2X stack is shown in FIG. 6). Currently reactive and adaptive DCC algorithms are defined in ETSI TS 102 687 V1.2.1, as described below.

The method according to the first aspect provides a solution of how to control radio channel load in V2X sensor sharing application.

One of the challenges with the sensor sharing application is the amount of generated data which needs to be shared with the surrounding vehicles by using V2X radio communications. It needs to be controlled to make sure the radio resources used are not congested.

Use of cellular modem (UE) as a vehicle sensor and to share mobile network cells measured in the vehicle UE as new object category in CPM messages has been proposed. This will include unique measured cell identifier (e.g. in LTE system EUTRAN frequency and physical cell identifier) with its measured signal power (LTE RSRP) and quality (LTE RSRQ). By combining cell measurements in the source vehicle with its georeferenced parameters (location, speed, heading) and broadcasting it via V2V messages (CPM), receiving vehicles (e.g. those following source vehicle within the V2V direct radio communication range) could predict the mobile network coverage up to a few seconds ahead (vehicle speed dependent).

According to the current 3GPP standard, the first UE is required to measure up to 96 cells (32 cells for one intra-frequency and two inter-frequencies) to support terminal mobility (cell handovers and reselections) on Uu radio interface (Indirect V2X Communication). Also there is a trade-off between the number of measured cells reported in V2V messages and the radio channel occupancy (CBR) which should be minimized. Higher number of reported cells with their measurements increases network coverage awareness in the receiving vehicle UEs (which may help with QoS prediction) but contributes to the higher CBR. As a result, the amount of reported cells should be controlled to avoid channel access delays and packet collisions contributing to effective range degradation for safety ITS services.

Nevertheless, conventional ETSI ITS CPM architecture and message generation rules do not include cellular modem as a vehicle sensor and the mobile network cells (cellular base stations transmitting data) as CPM objects. As a result, specific mechanisms to control the number of reported cells in CPM (or similar message) are not considered. The method according to the first aspect provides a solution to this problem.

The relevant standards documents for V2X technology are the following:
  3GPP TR 22.186 Service requirements for enhanced V2X scenarios
  3GPP TR 22.886 Study on enhancement of 3GPP support for 5G V2X services
  ETSI ITS TS 103 324 Cooperative Observation Services
  ETSI ITS TR 103 562 Informative Report for the Collective Perception Service Hence, the method according to the first aspect controls the radio channel use in V2X in a distributed manner. Particularly, the transmitting V2X UE (i.e. the first UE) is controlled to dynamically limit the number of cells (perceived Cooperative Perception Message objects) broadcasted in V2X messages (i.e. the first message) based on the Channel Busy Ratio or similar radio channel congestion related parameter (i.e. the first channel load metric). As the Channel Busy Ratio may be defined differently for different V2X access technologies e.g. ITS-G5 and C-V2X, the method may be implemented in higher layers (e.g. facilities layer of the ITS protocol stack defined in ETSI EN 302 665) in a radio access technology agnostic way. As a result, the method may be considered as cross-layer radio channel congestion control mechanism.

Collective Perception Service

ETSI TR 103 562 V0.0.15 specifies the Collective Perception Service, to support ITS applications, which is in support of the BSA road safety application. Collective Perception aims at sharing information about the current driving environment with other ITS-Ss. For this purpose, the Collective Perception Service provides data about objects (i.e. other road participants, obstacles and alike) in abstract descriptions. Collective Perception reduces the ambient uncertainty of an ITS-S about its current environment, as other ITS-Ss contribute context information. This includes the definition of the syntax and semantics of the Collective Perception Service (CPS) and detailed specification of the data, the messages and the message handling to increase the awareness of the environment in a cooperative manner.

The CP message offers ITS-stations the possibility to share information about objects in the surrounding, which have been detected by sensors, cameras or other information sources. Example use cases include: detection of Non- Connected Road Users; detection of Safety-Critical Objects; and CAM Information Aggregation. For these examples, the CP message has been filled with information obtained for local sensors. However, in some cases it can be meaningful not only to use sensor data but also information obtained from received CAMs to generate and send out a CP message. Applications using aggregated CAM information are typically relevant for services provided by the infrastructure side and the ITS central systems. Note that for security reasons it is necessary to authorize each ITS-S from which a CAM has been received. Examples where CAM information aggregation is meaningful include Increasing Awareness; and Awareness about ITS-communication enabled persons on the road.

There are two possible approaches for transmitting the information related to Collective Perception: Periodic Transmission and CP Object Based Transmission.

In Periodic Transmission, the host-ITS-S should send a CPM, whenever it has detected at least one object with sufficient level of confidence that needs to be exchanged with neighbouring ITS-Ss. Even if no objects are selected for transmission, the ITS-S should send CPM at a minimum frequency to inform that it did not detect an object and to indicate its ability to share perceived objects. CPMs disseminated at the minimum frequency shall include at least the FoV Container. As a result, receiving ITS-Ss are able to derive their combined FoV.

Concerning the inclusion of detected objects, the CP service aims at addressing the trade-off which needs to be faced concerning object age and channel utilisation: From the perspective of prospective applications employing information received by the CPMs, the contained information should be as detailed as possible and updated information shall be provided as often as possible. From the perspective of the ITS-G5 stack, channel utilisation shall be minimised, therefore demanding shorter message size and lower transmission frequencies.

To reduce the resulting message size, objects need to be assessed prior to their transmission.

The CPM generation frequency is managed by the CP basic service; it defines the time interval between two consecutive CPM generations. The upper and lower limits of the transmission interval are set as:

follows:
  The CPM generation interval shall not be inferior to T_GenCpmMin=200 ms. This corresponds to the CPM generation rate of 5 Hz.
  The CPM generation interval shall not be superior to T_GenCpmMax=1 000 ms. This corresponds to the CPM generation rate of 1 Hz.

The parameter T_GenCpm_Dcc shall provide the minimum time interval between two consecutive CPM generations in order to reduce the CPM generation according to the channel usage requirements of Decentralized Congestion Control (DCC) as specified in ETSI TS 102 724. This facilitates the adjustment of the CPM generation rate to the remaining capacity of the radio channel in case of channel congestion. The parameter T_GenCpm_Dcc shall be provided by the management entity in the unit of milliseconds. The value range of T_GenCpm_DCC shall be limited to T_GenCpmMin≤T_GenCpm_DCC≤T_GenCpmMax. If the management entity provides this parameter with a value above T_GenCpmMax, T_GenCpm_DCC shall be set to T_GenCpmMax and if the value is below T_GenCpmMin or if this parameter is not provided, the T_GenCpm_Dcc shall be set to T_GenCpmMin.

The parameter T_GenCpm represents the currently valid upper limit of the CPM generation interval. The default value of T_GenCpm shall be T_GenCpmMax. T_GenCpm shall be set to the time elapsed since the last CPM generation, if a CPM is triggered according to the conditions outlined below.

The trigger to send a CP message is made per message. The following conditions shall be satisfied to send a CPM:
1. The time elapsed since the last CPM generation is equal to or greater than T_GenCpm;
2. The FoV-Container needs to be included, after T_GenCpmMax, even in case no objects are perceived by the transmitting ITS-S; and
3. A CPM needs to be send, whenever at least one object is selected for transmission In CP Object Based Transmission, a CPM is generated upon satisfying any of the following conditions:
1. A new object is detected; and/or
2. A change in absolute position of an object is detected and the object was previously perceived as static; and/or
3. A change in speed/heading of an object is detected and the object was previously perceived as dynamic.

Channel Load Metric

The method comprises determining, for example by the first UE, the first channel load metric, for example a channel busy ratio, CBR, of the set of channel load metrics of the first channel of the set of channels of the network.

In one example, determining the first channel load metric comprises measuring, by the first UE, the first channel load metric, for example a CBR.

Channels

The method comprises determining, for example by the first UE, the first channel load metric, for example a channel busy ratio, CBR, of the set of channel load metrics of the first channel of the set of channels of the network.

In one example, the first channel comprises and/or is a control channel, a common channel, a service channel, a safety channel and/or a signalling channel.

In one example, the set of channels comprises C channels, where C is a natural number of at least 1, for example 2, 3, 4, 5, 6, 7, 8, 9, 10 or more. In one example, the method comprises determining C channel load metrics corresponding to the respective C channels of the set of channels. In one example, the method comprises selecting the first channel of the set of channels and determining the first channel load metric of the selected channel.

The method comprises transmitting, by the first UE, the generated first message, optionally on the first channel. In one example, the method comprises transmitting, by the first UE, the generated first message on the first channel. That is, the first channel load metric is determined for the same channel on which the first message is transmitted.

Channel Busy Ratio

In one example, the first channel load metric is a CBR.

The channel busy ratio (CBR) is used for determining the transmission behaviour. CBR is an estimate of how much a single channel is used based on listening on surrounding radio transmitters. The determination of CBR for the equipment shall be as performed according to Equation 1. Any other equivalent mechanism may be used providing a CBR with a deviation of ±3%.

$$CBR = \frac{T_{busy}}{T_{CBR}} \tag{1}$$

Tbusy is the period of time in milliseconds when the strength of received signals over a period of TCBR exceeds −85 dBm. TCBR is equal to 100 milliseconds.

Ton is the duration of a transmission by the equipment and Toff is the time interval between two consecutive transmissions by the equipment.

Duty cycle is defined as the ratio, expressed as a percentage of the transmitter total "on" time on one carrier frequency, relative to 1 second period.

The following limits apply:

$$0 < \text{Ton} \le 4 \text{ ms} \tag{2}$$

$$\text{duty cycle} \le 3 \% \tag{3}$$

$$\text{If } CBR \text{ is} < 0{,}62, \text{ then } \textit{Toff} \ge 25 \text{ ms} \tag{4}$$

$$\text{If } CBR \text{ is} \ge 0{,}62, \text{ then } \textit{Toff} \ge 25 \text{ ms and } \textit{Toff} \ge \tag{5}$$
$$\min\left\{1000 \text{ ms}, \ T_{on} \times \left(4000 \times \frac{CBR - 0.62}{CBR} - 1\right)\right\}$$

In one example, the first channel load metric comprises a radio signal, for example a CBR, a Reference Signal Strength Indicator, RSSI, a Reference Signal Received Power, RSRP, a Reference Signal Received Quality, RSRQ, a latency, a bitrate and/or a data buffer occupancy rate and/or a detector signal, for example provided by an imaging detector, a RADAR detector and/or a LIDAR detector.

Reference Signal Strength Indicator (RSSI), Reference Signals Received Power (RSRP) and Reference Signal Received Quality (RSRQ) are measures of signal level and quality for mobile networks, such as LTE networks. In mobile networks, when a mobile device moves from cell to cell and performs cell selection/reselection and handover, the device preferably measures the signal strength/quality of the neighbour cells.

Reference Signal Received Power (RSRP) is a Received Signal Strength Indicator (RSSI) type of measurement. RSRP is the power of the LTE Reference Signals spread over the full bandwidth and narrowband. A minimum of −20 dB SINR (of the S-Synch channel) is needed to detect RSRP/RSRQ. Generally, QoS increases if RSRP increases while QoS decreases if RSRP decreases.

Reference Signal Received Quality (RSRQ) is the quality considering also RSSI and the number of used Resource Blocks (N) RSRQ=(N*RSRP)/RSSI measured over the same bandwidth. RSRQ is a carrier to interference (C/I) type of measurement and it indicates the quality of the received reference signal. The RSRQ measurement provides additional information when RSRP is not sufficient to make a reliable handover or cell reselection decision, for example. Generally, QoS increases if RSRQ increases while QoS decreases if RSRQ decreases.

Generally, the latency is a time delay in data transmission between one node and another node, for example between the first UE and a second UE. In mobile communications, two different types of latency may be measured: C-Plane latency and U-Plane latency. In one example, the first channel load metric comprises C-Plane latency and/or U-Plane latency. Generally, QoS increases if the latency decreases while QoS decreases if the latency increases.

Generally, QoS increases if the bitrate increases while QoS decreases if the bitrate decreases.

Generally, QoS increases if the data buffer occupancy rate decreases while QoS decreases if the data buffer occupancy rate increases.

The detector signal may be provided, for example, by an imaging detector, a RADAR detector and/or a LIDAR detector. Imaging detectors include, for example, cameras and video cameras. The detector signal may include, for example, an obstacle for example an obstruction, a vehicle such as a stationary vehicle and/or a pedestrian. Hence, measuring the first channel load metric comprises detecting the detector signal and identifying the first event comprises determining whether an obstacle is included in the detector signal, such that the first message comprises the first identifier of the obstacle.

Message

The method comprises generating, by the first UE, the first message, for example a V2X message, of a set of messages according to the determined first channel load metric.

In one example, the first message complies with, comprises and/or is as an ETSI Cooperative Awareness Basic Service (EN 302 637-2); SAE J2735—Dedicated Short Range Communications (DSRC) Message Set Dictionary; Society of Automotive Engineers (SAE) J2735-defined Basic Safety Message (BSM) over a Dedicated Short Range Communications (DSRC) wireless communications link as defined in the Institute of Electrical and Electronics Engineers (IEEE) 1609 suite and IEEE 802.11 standards (Cooperative Awareness Basic Service equivalent in US). In one example embodiment, the transmitting, by the first UE, the generated first message, comprises periodically transmitting the first message. In one example embodiment, the transmitting, by the first UE, the generated first message, comprises transmitting the first message in response to a request.

Generating

The method comprises generating, by the first UE, the first message, for example a V2X message, of a set of messages according to the determined first channel load metric.

For example, if the first channel load metric is relatively high, the first message may be adapted (such as a size thereof restricted) so as to attenuate an increase in the first channel load metric due to transmission of the first message, for example on the same first channel. For example, if the first channel load metric is relatively high, transmission of the first message may be deferred or denied, so as to attenuate an increase in the first channel load metric due to transmission of the first message, for example on the same first channel. In contrast, for example, if the first channel load metric is relatively low, the first message may be augmented (such as such as to include additional content) so as to enhance safety. For example, if the first channel load metric is relatively low, the first message may be repeated, so as to enhance safety.

In one example, generating, by the first UE, the first message comprises selectively generating the first message. For example, the first message may be selectively generated conditionally upon a value of the first channel load metric.

In one example, generating, by the first UE, the first message comprises selectively generating the first message if the first channel load metric is within a first predetermined range of a set of predetermined ranges and/or at most a first threshold of a set of thresholds.

In one example, the first channel load metric is a CBR and the set of predetermined ranges and the set of thresholds is:
0<CBR<0.3—Low
0.3<CBR<0.65—Medium
0.65<CBR<0.8—High (congested channel)
0.8<CBR<1—Very high (very congested channel)

In one example, the first channel load metric is a CBR and the set of predetermined ranges and the set of thresholds is:
0≤CBR≤0.3—Low
0.3<CBR≤0.65—Medium
0.65<CBR≤0.8—High (congested channel)
0.8<CBR≤1—Very high (very congested channel)

In one example, the first channel load metric is a CBR and the set of predetermined ranges and the set of thresholds is according to ETSI TS 103 574 V1.1.1.

In one example, generating, by the first UE, the first message comprises reporting a number N of strongest cells, for example in a range from 3 to 96, for example the top 3 or top 10 or all of the strongest cells.

In one example, reporting the number N of strongest cells comprises dynamically reporting the number N, for example an adjusted number N, of strongest cells based on the first channel load metric, if the first channel load metric is within the first predetermined range and/or at most the first threshold of a set of threshold. For example, if the CBR is low or medium, the adjusted number N of strongest cells may be dynamically reported.

In one example, reporting the number N of strongest cells comprises statically reporting the number N, for example predefined number N, of strongest cells, if the first channel load metric is outside the first predetermined range and/or above the first threshold of a set of threshold. For example, if the CBR is high, the predefined number N of strongest cells may be statically reported.

In one example, generating, by the first UE, the first message comprises controlling a size of the first message, optionally based, at least in part, on the first channel metric. In this way, an increase of the first load metric, as a result of transmitting the first message, may be attenuated.

In one example, controlling the size of the first message comprises including and/or excluding message content therein. In this way, the size of the first message may be dynamically adjusted by the first UE, so as to better maintain a QoS, for example.

In one example, controlling the size of the first message comprises classifying a relevance of the message content and including and/or excluding the message content is based, at least in part, on a result of the classifying.

In one example, the message content comprises sensor information and/or a perceived object container, for example a first perceived object container of a set of perceived object containers.

For example, consider perceived physical objects defined in CPM such as other vehicles, Vulnerable Road Users (pedestrians or cyclists) or other stationary objects. Those objects in CPM are described by the distance and speed in the x/y plane of the coordinate system with respect to a ITS-S's reference point (as described with reference to FIG. 7). In case of the radio channel congestion (high CBR value, for example), it is beneficial to reduce the message size by only including those objects (their perceived object containers) in CPM which are most relevant to the transmitting ITS-S. Relevancy formula may be defined based on a combination of different perceived object parameters such as:

Distance—e.g. objects closer to the vehicle could be more relevant from the safety point of view; and/or
Speed—e.g. fast moving objects could be more relevant etc.; and/or
Acceleration; and/or
Object dimensions; and/or
Dynamic status—stationary or dynamic; and/or
Classification; and/or
Confidence; and/or
Object age.

Transmitting

The method comprises transmitting, by the first UE, the generated first message, optionally on the first channel.

In one example, the transmitting is according to a broadcast protocol, for example communication protocols used in C-ITS (e.g. ETSI Cooperative Awareness Basic Service (EN 302 637-2); SAE J2735—Dedicated Short Range Communications (DSRC) Message Set Dictionary; Society of Automotive Engineers (SAE) J2735-defined Basic Safety Message (BSM) over a Dedicated Short Range Communications (DSRC) wireless communications link as defined in the Institute of Electrical and Electronics Engineers (IEEE) 1609 suite and IEEE 802.11 standards (Cooperative Awareness Basic Service equivalent in US). In one example, the transmitting is according to a C-ITS communication protocol. In one example, the method complies with the On-Board System Requirements for V2V Safety Communications J2945/1_201603.

In one example, the transmitting, by the first UE, the generated first message, comprises and/or is wireless transmitting. In one example, the transmitting, by the first UE, the generated first message, comprises using LTE-V2X or NR-V2X PC5 radio access technology. The first message may be broadcast by the first UE as a message or as part of a message, such as an ETSI Cooperative Awareness Basic Service (EN 302 637-2); SAE J2735—Dedicated Short Range Communications (DSRC) Message Set Dictionary; Society of Automotive Engineers (SAE) J2735-defined Basic Safety Message (BSM) over a Dedicated Short Range Communications (DSRC) wireless communications link as defined in the Institute of Electrical and Electronics Engineers (IEEE) 1609 suite and IEEE 802.11 standards (Cooperative Awareness Basic Service equivalent in US). In one example embodiment, the transmitting, by the first UE, the generated first message, comprises periodically transmitting the first message. In one example embodiment, the transmitting, by the first UE, the generated first message, comprises transmitting the first message in response to a request.

In one example, the transmitting, by the first UE, the generated first message, comprises transmitting the generated first message as part of bi-directional communication, for example with a second UE and/or with an access point.

In one example, transmitting, by the first UE, the generated first message comprises broadcasting the generated first message.

A periodicity of broadcasting and/or content, for example type or breadth, of the first message may be determined by at least one of a vehicle speed, proximity of other vehicles and/or road users, location, environment type, priority or request. For example, where the first UE is included in a vehicle, the first message may be broadcast below a predetermined speed of the vehicle, such as a typical average vehicle speed in congestion or city traffic. For example, where the first UE is included in a vehicle, the first message may be broadcast if other vehicles and/or road users are in the proximity of the vehicle, such as if other vehicles and/or road users are detected in a vicinity of the vehicle. For example, the first message may be broadcast if a vehicle V2X modem of the vehicle receives V2X signals from other neighbouring vehicles or similar information from other on-board sensors, for example RADAR, LIDAR or camera. For example, where the first UE is included in a vehicle, the first message may be broadcast according to a map based location and/or type of environment of the vehicle. Broadcasting may be time limited, for example while the first UE and a second UE are in mutual transmitting and/or receiving range. Additionally and/or alternatively, hysteresis may be present in a measured cell quantity domain to control the message broadcasting. Additionally and/or alternatively, broadcasting may be enabled only if a specific ITS service is running in the first UE.

The first message may include additional information. For example, the first message may include an identifier of a cell(s) in which the first event was triggered, for example a downlink carrier frequency and/or a physical cell identifier. For example, the first message may include location information and/or identifier information of the first UE. For example, where the first UE is included in a vehicle, the first message may include safety critical or operational information, such as vehicle speed, vehicle location, vehicle acceleration, vehicle heading and/or physical vehicle parameters. Such safety critical or operational information may, for example, support C-ITS applications, avoid vehicle collisions, improve transport efficiency and/or comfort and/or support cooperative driving (i.e. vehicle platooning).

It should be understood that a typical communication range of DSRC depends on the application and/or the environment but may be up to 300-500 metres. In general, C-ITS applications may be designed to be technology agnostic and hence, the first environmental information may be transmitted via any supporting communication technology employed for V2X such as cellular Long Term Evolution (LTE) Device-to-Device and/or 5G.

In one example, the first message comprises data related to the first UE, for example a type, a speed, a location, an acceleration, a heading or a bearing (for example northbound, southbound, eastbound, westbound) and/or a lane. For example, if the first UE is a vehicle, the first message may comprise a type, a speed, a location, an acceleration, a heading or a bearing and/or a lane of the vehicle. In one example, the first message comprises data related to a mobile network cell related to the triggered first event, for example a type of a system such as 4G/LTE or 5G/New radio, a radio frequency used and/or a cell identifier at a physical layer (e.g. Physical Cell ID in LTE) on that frequency, a cell bandwidth, etc.

Quality of Service

The Radio Resource Control (RRC) protocol, for legacy 3GPP (non-vehicle LTE or 5G New Radio (NR)) User Equipment (UE), may support:

Broadcast of System Information related to the access stratum (AS);
Mobility functions including:
UE measurement reporting and control of the reporting for inter-cell and inter-RAT mobility;
Handover;
UE cell selection and reselection and control of cell selection and reselection;
Context transfer at handover;
QoS management functions;
UE measurement reporting and control of the reporting.

Generally and as described below in more detail, measurements, to be performed by UEs, of QoS performance indicators for example, for intra/inter-frequency mobility and/or for Inter-system (Radio Access Technology (RAT)) mobility such as between 4G and 5G, may be controlled by the mobile network, using broadcast or dedicated control signalling sent on a control channel, for example. Intra-frequency neighbour (cell) measurements are neighbour cell measurements performed by the UEs when the current and a target cell operates on the same carrier frequency. Typically in cellular networks, mobility within the same frequency layer (i.e. between cells with the same carrier frequency) is predominant. Good neighbour cell measurements are needed for cells that have the same carrier frequency as the serving cell in order to ensure good mobility support and easy network deployment. Search for neighbour cells with the same carrier frequency as the serving cell, and measurements of the relevant quantities for identified cells are needed. The UEs report measurement information in accordance with the measurement configuration as provided by the network which gives the measurement configuration applicable for a UE by dedicated signalling, for example using a RRCConnectionReconfiguration or a RRCConnectionResume message. The UEs may be requested to perform the following types of measurements:

1. Intra-frequency measurements: measurements at the downlink carrier frequency(ies) of the serving cell(s);
2. Inter-frequency measurements: measurements at frequencies that differ from any of the downlink carrier frequency(ies) of the serving cell(s);
3. Inter-RAT measurements of other frequencies e.g. GSM, 3G etc.

However, conventional 3GPP QoS architecture, for example, does not support advance notification (prediction) of mobile network coverage changes for V2X communications to support C-ITS applications. This is solved, at least in part, by the method according to the first aspect and/or the second, third and/or fourth aspects.

UE

Generally, in Universal Mobile Telecommunications System (UMTS) and 3GPP Long Term Evolution (LTE), UE devices allow users to access network services. In other words, a UE is any device used by a user to communicate on a network. The UE, for example the first UE, may be, for example, a device comprising a transmitter and a receiver or a transceiver, such as a mobile telephone or a laptop computer equipped with a mobile broadband adapter. The user may be a human user or a non-human user, for example a vehicle or infrastructure.

In one example, the set of UE devices comprises two or more UEs, for example 2, 3, 4, 5, 6, 7, 8, 9, 10, 100, 1000 or more UEs. In one example, the set of UE devices comprises N UEs where N is a natural number greater than 1. Each of the UEs of the set of UE devices may be as described with respect to the first UE.

Network

The network is preferably a peer-to-peer (P2P) network, particularly a mobile P2P (also known as cellular) network.

Generally, P2P networks have distributed network architectures composed of participants that make a portion of their resources (such as processing power, disk/cache storage or network bandwidth) available to other network participants. Generally, peers are entities (e.g. UEs, network entities) of both suppliers and consumers of resources, in contrast to traditional client-server models where only servers supply, and clients consume. Generally, user peers are a UE type of participants in the P2P network both providing services to other participants and requesting services from other participants. Generally, network peers are the participants in the P2P network deployed and controlled by operators/service providers both providing services to other participants (e.g. user peers or network peers) and requesting services from other participants, e.g. the cache server deployed by operators/service providers.

In one example, the network communicates via Cellular V2X (C-V2X).

Vehicle-to-everything (V2X) communication provides real-time and highly reliable information flows to enable safe, efficient and environmentally-conscious transportation services and paving the way to connected and automated driving (CAD). Cellular V2X (C-V2X) is the technology developed in 3GPP and is designed to operate in two modes:
1. Device-to-device: This is Vehicle-to-Vehicle (V2V), Vehicle-to-(Roadway) Infrastructure (V2I) and Vehicle-to-Pedestrian (V2P) direct communication without necessarily relying on network involvement for scheduling;
2. Device-to-network: This is Vehicle-to-Network (V2N) communication which uses the traditional cellular links to enable cloud services to be part of the end-to-end solution by means of network slicing architecture for vertical industries.

V2X may provide the performance to meet use cases such as intersection movement assist, emergency electronic brake light, forward collision warning, blind spot warning, lane change warning, as well as Advanced Driver Assistance Systems (ADAS), where vehicles may cooperate, coordinate and share sensed information.

C-V2X is based on 3GPP Release 14 and is considered superior to IEEE 802.11p, with respect to coverage, mobility support, delay, reliability and scalability, making C-V2X a suitable candidate in the 5.9 GHz ITS spectrum to meet the near-term vehicular communication requirements. C-V2X provides both device-to-device (V2V, V2I and V2P) and device-to-network (V2N) services. C-V2X is described in more detail below.

In one example, communication between the first UE and a second UE is via a sidelink (SL), for example a PC5 sidelink radio interface, preferably using C-V2X, as described in more detail below.

Additionally and/or alternatively, the network may be and/or comprise and/or provide a master-slave or a client-server type of relationship between the transmitting first UE and a receiving second UE. This may be beneficial when for cooperative services between the first UE and a second UE, for example cooperative manoeuvres including a first vehicle and a second vehicle, including the first UE and a second UE respectively. Such a master-slave or a client-server type of relationship may require an initial handshake connection agreement. Subsequently, the master or server may configure a measurement event in the slave or client, respectively, and then the slave or client reports when triggered.

In one example, the network comprises and/or is a Radio Access Network including one or more base stations. In one example, the network provides and/or supports core network routing traffic between base stations.

The first UE may connect to or communicate with or via an access point (AP) for example a Universal Terrestrial Radio Access Network (UTRAN) access point such as a base station Node B (Node B or NB) and/or an evolved base station Node B (eNodeB or eNB and/or a gNodeB (gNB). That is, the first may transmit data to and/or receive data from the access point, as described below. Furthermore, the UE may connect to or communicate with or via another such UE device.

It should be understood that a cell may be a radio network object that may be uniquely identified by the UE device from a cell identification that is broadcast over a geographical area from one UTRAN access point. A cell may be in either Frequency Division Duplex (FDD) or Time Division Duplex (TDD) mode.

It should be understood that a sector may be a sub-area of a cell. All sectors within the cell may be served by the same access point. A radio link within the sector may be identified by a single logical identification belonging to the sector.

In one example, the network comprises and/or is a mobile ad hoc network (MANET). Generally, MANETs (also known as wireless ad hoc networks or ad hoc wireless networks), comprise continuously self-configuring, infrastructure-less networks of mobile devices (for example UEs) connected wirelessly. Each device in a MANET is free to move independently in any direction, and will therefore change its links to other devices frequently (i.e. ad hoc). MANETs may operate independently or may be connected to the Internet. MANETs may include one or multiple and different transceivers between nodes. Hence, MANETs may provide highly dynamic, autonomous topologies.

In one example, the MANET comprises and/or is a vehicular ad hoc networks (VANET), an intelligent vehicular ad hoc network (InVANET), a smart phone ad hoc networks (SPAN), an internet-based mobile ad-hoc networks (iMANET), a hub-spoke MANET and/or a flying ad hoc networks (FANET).

Vehicular ad hoc networks (VANETs) are used for communication between vehicles and roadside equipment. Intelligent vehicular ad hoc networks (InVANETs) are a kind of artificial intelligence that helps vehicles to behave in intelligent manners during vehicle-to-vehicle collisions, accidents. Smart phone ad hoc networks (SPANs) leverage the existing hardware (primarily Bluetooth and Wi-Fi) in commercially available smart phones to create peer-to-peer networks without relying on cellular carrier networks, wireless access points, or traditional network infrastructure. SPANs differ from traditional hub and spoke networks, such as Wi-Fi Direct, in that they support multi-hop relays and there is no notion of a group leader so peers can join and leave at will without destroying the network. Internet-based mobile ad-hoc networks (iMANETs) is a type of wireless ad hoc network that supports Internet protocols such as TCP/UDP and IP. The network uses a network-layer routing protocol to link mobile nodes and establish routes distributedly and automatically. Multiple sub-MANETs may be connected in a classic Hub-Spoke VPN to create a geographically distributed MANET, known as a Hub-Spoke MANET. In such type of networks normal ad hoc routing algorithms does not apply directly. Flying ad hoc networks (FANETs) are composed of unmanned aerial vehicle, allowing great mobility and providing connectivity to remote areas.

In one example, the transmitting of the first message is periodic, for example having a frequency in a range from 1 Hz to 10 Hz. In one example, the transmitting of the first message is periodic over a predetermined period of time, for example in a range from 1 s to 100 s, during which the first UE and a second UE are within mutual transmitting and/or receiving range. In one example, the transmitting of the first message is responsive to (i.e. triggered by) the identifying, by the first UE, the first event amongst the set of events. In one example, the method comprises triggering the first event. In one example, the method comprises filtering the first event, thereby improving reliability thereof. In one example, the method comprises allowing for hysteresis before triggering the first event and/or before transmitting the first message.

Transmitting and Receiving

The first UE transmits the first message. It should be understood that the first UE comprises and/or is a transmitter.

Generally, depending on a type of connection and/or architecture thereof, two communication modes are defined for V2X: Direct V2X Communication and Indirect V2X Communication.

Direct V2X Communication is typically used for shorter range communication (e.g. up to 500 m). Direct V2X Communication may be based, for example, on the IEEE 802.11p standard in the US (similar to Wi-Fi technology but extended to vehicles), which may also be known as DSRC or ETSI ITS-G5 in Europe. Cellular V2X (C-V2X) technology based on 3GPP LTE Rel-14 (or Rel-15 New Radio) standard using LTE or NR PC5 interface may be used alternatively. Due to a direct radio link between two V2X devices, for example the first UE and a second UE, and/or a short communication range, this mode is typically more suitable for road safety applications requiring low latency and high reliability radio communication.

Indirect V2X Communication is typically used for longer range range communication (e.g. more than 500 m). Indirect V2X Communication may be based, for example, on cellular 3GPP Long Term Evolution (LTE) Rel-14 standard using C-V2X Uu radio interface or future 5G New Radio based interface. By leveraging coverage of mobile network infrastructures, the communication range of this mode may be extended significantly beyond 500 m. Since the mobile network elements (e.g. nodes) behave and/or are communication intermediaries between the communicating objects, this mode may also be known as V2N2V (Vehicle to Network to Vehicle) or V2N2P (Vehicle to Network to Pedestrian), for example. This indirect mode requires mobile network coverage and is typically more suitable to C-ITS applications having less stringent latency requirements.

Typically, a Uu interface is used for UE to network communication and a PC5 interface is used for UE to UE communication.

In one example, the transmitting comprises transmitting via a sidelink (SL), for example a PC5 sidelink radio interface, using C-V2X. In one example, the receiving comprises receiving via a sidelink (SL), for example a PC5 sidelink radio interface, using C-V2X.

These V2X communication modes may be used to transmit messages, for example ETSI Cooperative Awareness Messages (CAM) or SAE Basic Safety Messages (BSM), including safety critical or operational information, for example vehicle type, speed, location, acceleration, heading, physical vehicle parameters, to enhance safety by supporting C-ITS applications, avoiding vehicle collisions, improving transport efficiency and comfort (driving assistance) or supporting cooperative driving (i.e. vehicle platooning). Hence, by tracking neighbouring vehicle location and updates based on the received messages, for example CAM or BSM, safety may be enhanced. These messages may be broadcast, for example periodically at a frequency in a range of typically 1 to 10 Hz.

Additionally and/or alternatively, a combination of inputs from other vehicle sensors may be also used, for example camera, RADAR and/or LIDAR, to support identification of various road objects in Local Dynamic Map, to support Advanced Driver-Assistance Systems (ADAS) and/or higher levels of automomous driving, as described in more detail below.

In one example, the transmitting and/or the receiving the first message is via Direct V2X Communication. In one example, the transmitting and/or the receiving the first message is via Indirect V2X Communication. In one example, the first UE supports Direct V2X Communication and Indirect V2X Communication and the method comprises selecting, for example dynamically, transmitting and/or receiving via Direct V2X Communication or Indirect V2X Communication. In this way, a mode more suitable to the supported C-ITS application and its communication context may be selected.

In one example, the transmitting, by the first UE, the first message related to the identified first event comprises broadcasting and/or multicasting, by the first UE, the first message related to the identified first event. In this way, the first message may be shared by the first UE and optionally other UEs amongst the set of UE devices, without establishing a specific connection there between.

In one example, the transmitting, by the first UE, the first message related to the identified first event comprises establishing a connection, for example a direct connection, between the first UE and a second UE. In this way, the first UE and a second UE may communicate, for example directly and/or bidirectionally. In one example, the transmitting, by the first UE, the first message related to the identified first event comprises establishing a connection and/or a set of connections, for example a direct connection and/or a set of direct connections, between the first UE and a plurality of UEs, for example the set of UE devices (not including the first UE), for example a subset of the set of UE devices, such as included in a vehicle platoon. Methods of establishing connections between UE devices are known.

In one example, the first UE is included in and/or comprises a first vehicle, for example having a level of automation according to Table 1. Examples of vehicles include bicycles, motorcycles, cars, buses, vans (also known as light goods vehicles), lorries or trucks (also known as heavy goods vehicles) and commercial vehicles, such as fork lift trucks, diggers, snow ploughs, etc. (i.e. road vehicles).

TABLE 1

Autonomy levels for vehicles.

| Level | Name | Description |
|---|---|---|
| | | Human driver monitors the driving environment |
| 0 | No Automation | the full-time performance by the human driver of all aspects of the dynamic driving task, even when enhanced by warning or intervention systems |
| 1 | Driver Assistance | the driving mode-specific execution by a driver assistance system of either steering or acceleration/deceleration using information about the driving environment and with the expectation that the human driver perform all remaining aspects of the dynamic driving task |

TABLE 1-continued

Autonomy levels for vehicles.

| Level | Name | Description |
|---|---|---|
| 2 | Partial Automation | the driving mode-specific execution by one or more driver assistance systems of both steering and acceleration/deceleration using information about the driving environment and with the expectation that the human driver perform all remaining aspects of the dynamic driving task |

Automated driving system ("system") monitors the driving environment

| Level | Name | Description |
|---|---|---|
| 3 | Conditional Automation | the driving mode-specific performance by an automated driving system of all aspects of the dynamic driving task with the expectation that the human driver will respond appropriately to a request to intervene |
| 4 | High Automation | the driving mode-specific performance by an automated driving system of all aspects of the dynamic driving task, even if a human driver does not respond appropriately to a request to intervene |
| 5 | Full Automation | the full-time performance by an automated driving system of all aspects of the dynamic driving task under all roadway and environmental conditions that can be managed by a human driver |

Network

A second aspect provides a network, for example a peer-to-peer network or a cellular network, comprising a set of user equipment, UE, devices, including a first UE;
wherein the first UE is arranged to:
determine a first channel load metric, for example a channel busy ratio, CBR, of a set of channel load metrics of a first channel of a set of channels of the network;
generate a first message, for example a V2X message, of a set of messages according to the determined first channel load metric; and
transmit, by the first UE, the generated first message, optionally on the first channel.

The network, the set of UE devices, the first UE, the first channel load metric, the set of channel load metrics, the first channel, the set of channels, the first message, the set of messages may de as described with respect to the first aspect.

UE Device

A third aspect provides a user equipment, UE, device arranged to:
determine a first channel load metric, for example a channel busy ratio, CBR, of a set of channel load metrics of a first channel of a set of channels of the network;
generate a first message, for example a V2X message, of a set of messages according to the determined first channel load metric; and
transmit, by the first UE, the generated first message, optionally on the first channel.

The network, the set of UE devices, the first UE, the first channel load metric, the set of channel load metrics, the first channel, the set of channels, the first message, the set of messages may de as described with respect to the first aspect.

In one example, the first UE comprises a transmitter. In one example, the first UE comprises a control unit. In one example, the first UE comprise a processor and a memory. In one example, the first UE comprises a storage. In one example, the first UE is communicatively coupleable to a remote storage.

In one example, the first UE supports V2X communication. For example, the first UE may be suitable for or included in a vehicle, infrastructure or a VRU device. In one example, the first UE comprises a V2X device. In one example, the first UE is a V2X device. V2X standard include: ETSI Cooperative Awareness Basic Service (EN 302 637-2); SAE J2735—Dedicated Short Range Communications (DSRC) Message Set Dictionary; and 3GPP TR 22.885 Study on LTE support for Vehicle to Everything (V2X) services. V2X communication includes vehicle-to-vehicle (V2V), vehicle-to-infrastructure (V2I), and vehicle-to-pedestrian (V2P) communication. For example, the first UE may be suitable for or included in a vehicle, infrastructure or a pedestrian device. In addition, V2X devices refer to any equipment able to transmit and/or receive V2X messages regardless of the underlying communication technology and independently of other functions that the V2X devices may have. The V2X devices may include, for example, devices fitted or retrofitted to vehicles, devices included in infrastructure such as traffic lights, traffic signs, road gantries and VRU devices such as smartwatches, smartphones, tablets, personal GPS navigation devices or wearable devices. In one example, the first UE comprises a V2X device. In one example, the first UE is a V2X device.

In one example, the first UE is arranged to control the transmitter to transmit according to a broadcast protocol, for example communication protocols used in C-ITS (e.g. ETSI Cooperative Awareness Basic Service (EN 302 637-2); SAE J2735—Dedicated Short Range Communications (DSRC) Message Set Dictionary; Society of Automotive Engineers (SAE) J2735-defined Basic Safety Message (BSM) over a Dedicated Short Range Communications (DSRC) wireless communications link as defined in the Institute of Electrical and Electronics Engineers (IEEE) 1609 suite and IEEE 802.11 standards (Cooperative Awareness Basic Service equivalent in US). In one example, the first UE is arranged to control the transmitter to transmit according to a C-ITS communication protocol. In one example, the method complies with the On-Board System Requirements for V2V Safety Communications J2945/1_201603.

In one example, the transmitter comprises and/or is a wireless transmitter. In one example, the transmitter comprises a wireless transmitter. In one example, the transmitter is a wireless transmitter. The first message may be transmitted using LTE-V2X or NR-V2X PC5 radio access technology. The first message may be broadcast by the first UE as a message or as part of a message, such as an ETSI Cooperative Awareness Basic Service (EN 302 637-2); SAE J2735—Dedicated Short Range Communications (DSRC) Message Set Dictionary; Society of Automotive Engineers (SAE) J2735-defined Basic Safety Message (BSM) over a Dedicated Short Range Communications (DSRC) wireless communications link as defined in the Institute of Electrical and Electronics Engineers (IEEE) 1609 suite and IEEE 802.11 standards (Cooperative Awareness Basic Service equivalent in US). In one example embodiment, the first UE is arranged to control the transmitter to transmit a message, wherein the message comprises the first message. In one example embodiment, the first UE is arranged to control the transmitter to periodically transmit a message, wherein the message comprises the first message. In one example embodiment, the first UE is arranged to control the transmitter to transmit a message in response to a request to transmit the message.

A periodicity of broadcasting and/or content, for example type or breadth, of the first message may be determined by at least one of a vehicle speed, proximity of other vehicles and/or road users, location, environment type, priority or request. For example, where the first UE is included in a vehicle, the first message may be broadcast below a predetermined speed of the vehicle, such as a typical average vehicle speed in congestion or city traffic. For example, where the first UE is included in a vehicle, the first message may be broadcast if other vehicles and/or road users are in the proximity of the vehicle, such as if other vehicles and/or road users are detected in a vicinity of the vehicle. For example, the first message may be broadcast if a vehicle V2X modem of the vehicle receives V2X signals from other neighbouring vehicles or similar information from other on-board sensors, for example RADAR, LIDAR or camera. For example, where the first UE is included in a vehicle, the first message may be broadcast according to a map based location and/or type of environment of the vehicle. Broadcasting may be time limited, for example while the first UE and the second UE are in mutual transmitting and/or receiving range. Additionally and/or alternatively, hysteresis may be present in a measured cell quantity domain to control the message broadcasting. Additionally and/or alternatively, broadcasting may be enabled only if a specific ITS service is running in the first UE.

The first message may include additional information. For example, the first message may include an identifier of a cell(s) in which the first event was triggered, for example a downlink carrier frequency and/or a physical cell identifier. For example, the first message may include location information and/or identifier information of the first UE. For example, where the first UE is included in a vehicle, the first message may include safety critical or operational information, such as vehicle speed, vehicle location, vehicle acceleration, vehicle heading and/or physical vehicle parameters. Such safety critical or operational information may, for example, support C-ITS applications, avoid vehicle collisions, improve transport efficiency and/or comfort and/or support cooperative driving (i.e. vehicle platooning).

It should be understood that a typical communication range of DSRC depends on the application and/or the environment but may be up to 300-500 metres. In general, C-ITS applications may be designed to be technology agnostic and hence, the first environmental information may be transmitted via any supporting communication technology employed for V2X such as cellular Long Term Evolution (LTE) Device-to-Device and/or 5G.

In one example, the first UE comprise a receiver. In one example, the first UE comprise a control unit. In one example, the first UE comprise a processor and a memory. In one example, the first UE comprise a storage. In one example, the first UE is communicatively coupleable to a remote storage.

It should be understood that In one example, the first UE support V2X communication, as described previously. For example, In one example, the first UE is suitable for or included in a vehicle, infrastructure or a VRU device. In one example, the first UE comprises a V2X device. In one example, the first UE is a V2X device.

In one example, the first UE is arranged to control the receiver to receive according to communication protocols used in C-ITS. In one example, the first UE is arranged to control the receiver to receive according to a C-ITS communication protocol.

It should be understood that the receiver may be a wireless receiver. In one example, the receiver comprises a wireless receiver. In one example, the receiver is a wireless receiver. The first message may be received as a message or as part of a message, such as an ETSI Cooperative Awareness Basic Service (EN 302 637-2) messages; SAE J2735—Dedicated Short Range Communications (DSRC) Message Set Dictionary; Society of Automotive Engineers (SAE) J2735-defined Basic Safety Message (BSM) over a Dedicated Short Range Communications (DSRC) wireless communications link as defined in the Institute of Electrical and Electronics Engineers (IEEE) 1609 suite and IEEE 802.11 standards (Cooperative Awareness Basic Service equivalent in US).

CRM

The fourth aspect provides a tangible non-transient computer-readable storage medium having recorded thereon instructions which when implemented by a user equipment, UE, device, cause the UE device to perform a method of controlling a network, preferably a peer-to-peer network, the method according to the first aspect.

Abbreviations

BSM Basic Safety Message
BTP Basic Transport Protocol
CA Cooperative Awareness
CAM Cooperative Awareness Message
CAM Cooperative Awareness Message
CAS Cooperative Awareness Service
CBP Channel Busy Percentage
CBR Channel Busy Ratio
CCA Clear Channel Assessment
CCH Control Channel
CL Channel Load
CP Collective Perception
CPM Collective Perception Message
CPS Collective Perception Service
DCC Decentralized Congestion Control
DCC_ACC DCC component of the ACCess layer
DCC_FAC DCC component of the FACilities layer
DCC_NET DCC component of the NETwork layer
DENM Decentralized Environmental Notification Message
ECPR Environment- and Context-aware Combined Power and Rate distributed congestion control
EDCA Enhanced Distributed Channel Access
FIR Finite Impulse Response
FoV Field of View
GPS Global Positioning System
I2V Infrastructure to Vehicle
iCS iTetris Control System
IP Internet Protocol
IPG Inter-Packet Gap
ITS Intelligent Transport Systems
ITS Intelligent Transportation System
ITS-AID ITS Application Identifier
ITS-G5 Radio interface, collectively known as the 5 GHz ITS frequency band ITS-S Intelligent Transport Systems Station
IT S-S ITS Station
LIMERIC LInear MEssage Rate Integrated Control
LoA Level of Automation
LOS Line Of Sight
LOS-C stable flow Level-of-Service of traffic conditions
LOS-F fully saturated (breakdown flow) Level-of-Service of traffic conditions
MAC Medium Access Control
NAR Neighborhood Awareness Ratio
OV Originating Vehicle
PDR Packet Delivery Ratio
PER Packet Error Rate
PHY Physical Layer
PIR Packet Inter-Reception time
PO Perceived Object
PSID Provider Service Identifier
QPSK Quadrature Phase-Shift Keying
R-DCC Reactive DCC
RNAR Ratio of Neighbors Above Range
RSU Road Side Unit
RX Receive
SINR Signal to Interference and Noise Ratio
SUMO Simulation of Urban MObility
TA Target Awareness
TC Traffic Class
TCP/IP Transmission Control Protocol/Internet Protocol
T-DCC DCC with solely CAM triggering conditions
TDC Transmit Datarate Control
TPC Transmit Power Control
TRC Transmit Rate Control
TX Transmit
UDP User Datagram Protocol
UDP/IP User Datagram Protocol/Internet Protocol
UTC Coordinated Universal Time
VANET Vehicular Ad Hoc NETworks
V2I Vehicle to Infrastructure
V2V Vehicle to Vehicle
WAVE Wireless Access in Vehicular Environments
WLAN Wireless Local Area Network
X2X ITS-S to ITS-S Definitions Channel busy ratio (CBR): time-dependent value between zero and one representing the fraction of time that a single radio channel is busy with transmissions.

Collective Perception (CP): The concept of sharing the perceived environment of an ITS-S based on perception sensors. In contrast to Cooperative Awareness (CA), an ITS-S broadcasts information about its current (driving) environment rather than about itself. Hence, CP is the concept of actively exchanging locally perceived objects between different ITS-Ss by means of V2X communication technology. CP decreases the ambient uncertainty of ITS-Ss by contributing information to their mutual Field-of-Views.

Collective Perception (CP) basic service: facility at the ITS-S facilities layer to generate, receive and process CPM.

Collective Perception Message (CPM): CP basic service PDU

Collective Perception (CPM) data: partial or complete CPM payload

Collective Perception (CPM) protocol: ITS facilities layer protocol for the operation of the CPM transmission and reception.

End-to-end latency: Time it takes to transfer a given piece of information from a source to a destination, measured at the application level, from the moment it is transmitted by the source to the moment it is received at the destination.

Environment Model: The current representation of the immediate environment of an ITS-S, including all perceived objects perceived by either local perception sensors or received by V2X.

CP Object: Aggregated and interpreted abstract information gathered by perception sensors about other traffic participants and obstacles. Objects can be represented mathematically by a set of variables describing, amongst other, their dynamic state and geometric dimension. The state variables associated to an object are interpreted as an observation for a certain point in time and are therefore always accompanied by a time reference.

ITS Central System: an ITS system in the backend, e.g. traffic control center, traffic management center, or cloud system from road authorities, ITS application suppliers or automotive OEMs. According to ITS central subsystem, which contains a central ITS station, is part of an ITS central system.

Sensor Measurement: Based on the measurement principle of a local perception sensor mounted to an ITS-S, feature extraction algorithms provide abstract object descriptions. These are referred to as "Sensor Measurements". The feature extraction algorithm thereby processes a sensor's raw data (e.g. reflection images, camera images, etc.) to generate an object description.

Road Side Unit: A stationary infrastructure entity supporting V2X applications that can exchange messages with other entities supporting V2X applications.

V2X: vehicle to vehicle (V2V), vehicle to infrastructure (V2I) and/or infrastructure to vehicle (I2V), or vehicle to network (V2N) and/or network to vehicle (N2V) communication Reliability (%): The success probability of transmitting X bytes within a certain delay, which is the time it takes to deliver a small data packet from the radio protocol layer 2/3 SDU ingress point to the radio protocol layer 2/3 SDU egress point of the radio interface.

V2X Scenarios

3GPP TS 22.186 V16.1.0 describes different V2X scenarios require the transport of V2X messages with different performance requirements for the 3GPP system. This Technical Specification specifies service requirements to enhance 3GPP support for V2X scenarios in the following six areas:

1. General Aspects: interworking, communication-related requirements valid for all V2X scenarios.

2. Vehicles Platooning enables the vehicles to dynamically form a group travelling together. All the vehicles in the platoon receive periodic data from the leading vehicle, in order to carry on platoon operations. This information allows the distance between vehicles to become extremely small, i.e., the gap distance translated to time can be very low (sub second). Platooning applications may allow the vehicles following to be autonomously driven.

3. Advanced Driving enables semi-automated or fully-automated driving. Longer inter-vehicle distance is assumed. Each vehicle and/or RSU shares data obtained from its local sensors with vehicles in proximity, thus allowing vehicles to coordinate their trajectories or maneuvers. In addition, each vehicle shares its driving intention with vehicles in proximity. The benefits of this use case group are safer traveling, collision avoidance, and improved traffic efficiency.

4. Extended Sensors enables the exchange of raw or processed data gathered through local sensors or live video data among vehicles, RSUs, devices of pedestrians and V2X application servers. The vehicles can enhance the perception of their environment beyond what their own sensors can detect and have a more holistic view of the local situation.

5. Remote Driving enables a remote driver or a V2X application to operate a remote vehicle for those passengers who cannot drive themselves or a remote vehicle located in dangerous environments. For a case where variation is limited and routes are predictable, such as public transportation, driving based on cloud computing can be used. In addition, access to cloud-based back-end service platform can be considered for this use case group.

6. Vehicle quality of service support enables a V2X application to be timely notified of expected or estimated change of quality of service before actual change occurs and to enable the 3GPP System to modify the quality of service in line with V2X application's quality of service needs. Based on the quality of service information, the V2X application can adapt behaviour to 3GPP System's conditions. The benefits of this use case group are offerings of smoother user experience of service.

A relevant aspect of advanced V2X applications is the Level of Automation (LoA), which reflects the functional aspects of the technology and affects the system performance requirements. In accordance with the levels from SAE [4], the LoA are: 0—No Automation; 1—Driver Assistance; 2—Partial Automation; 3—Conditional Automation; 4—High Automation; and 5—Full Automation. A distinction is drawn between lower levels and higher levels based on whether the human operator or the automated system is primarily responsible for monitoring the driving environment. The 3GPP system provides the performances expected for all levels of automation.

General Definitions

Throughout this specification, the term "comprising" or "comprises" means including the component(s), unit(s), module(s), feature(s) or integer(s) specified but not to the exclusion of the presence of other components, units, modules, features or integers.

The term "consisting of" or "consists of" means including the component(s), unit(s), module(s), feature(s) or integer(s) specified but excluding other components, units, modules, features or integers.

Whenever appropriate, depending upon the context, the use of the term "comprises" or "comprising" may also be taken to include the meaning "consists essentially of" or "consisting essentially of", and also may also be taken to include the meaning "consists of" or "consisting of".

The optional features set out herein may be used either individually or in combination with each other where appropriate and particularly in the combinations as set out in the accompanying claims. The optional features for each aspect or exemplary embodiment of the invention, as set out herein are also applicable to all other aspects or exemplary embodiments of the invention, where appropriate. In other words, the skilled person reading this specification should consider the optional features for each aspect or exemplary embodiment of the invention as interchangeable and combinable between different aspects and exemplary embodiments.

Figure 2:
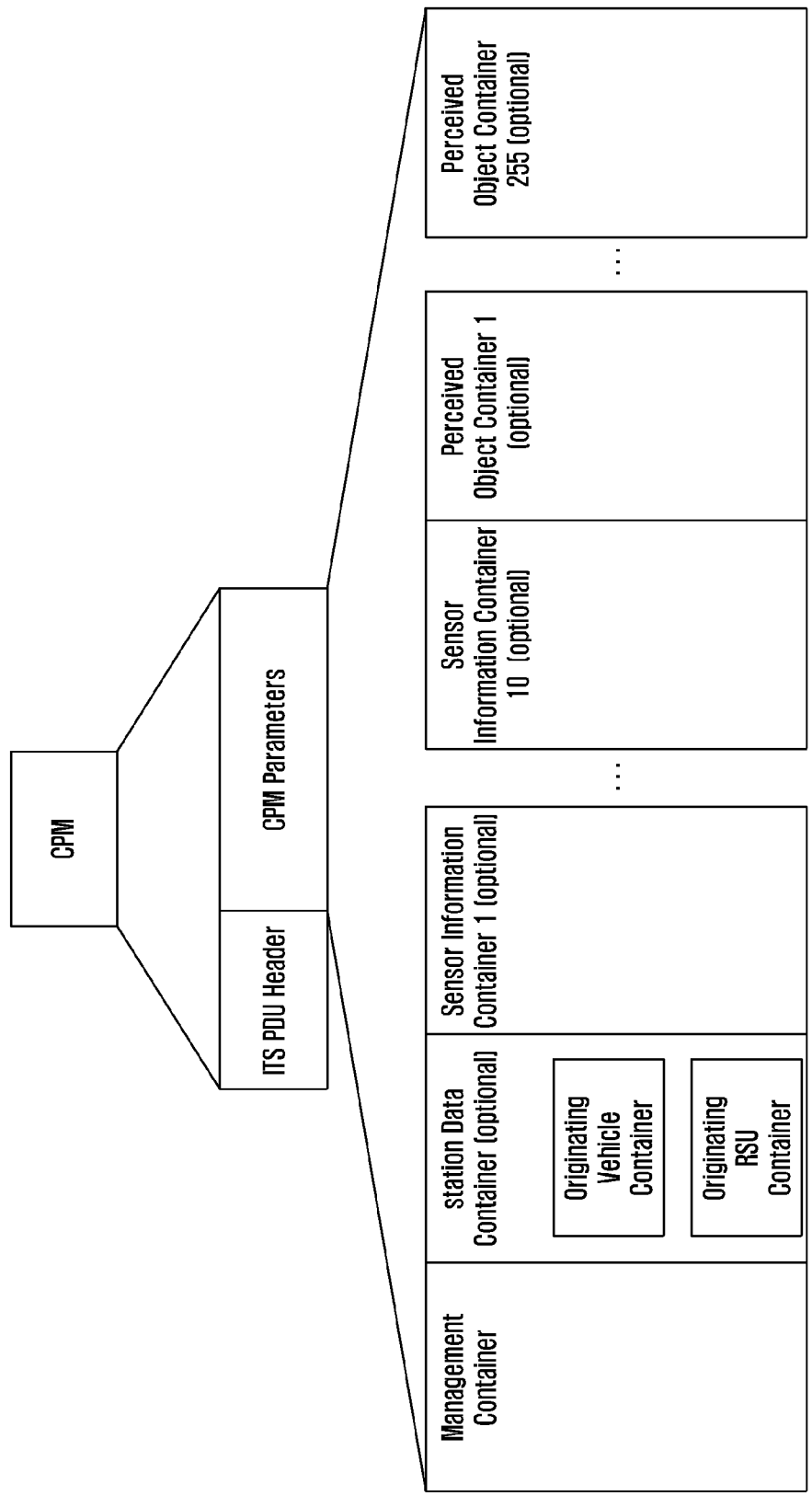
FIG. 2 schematically depicts a Cooperative Perception Message (CPM) protocol data unit (PDU)
Figure 3:
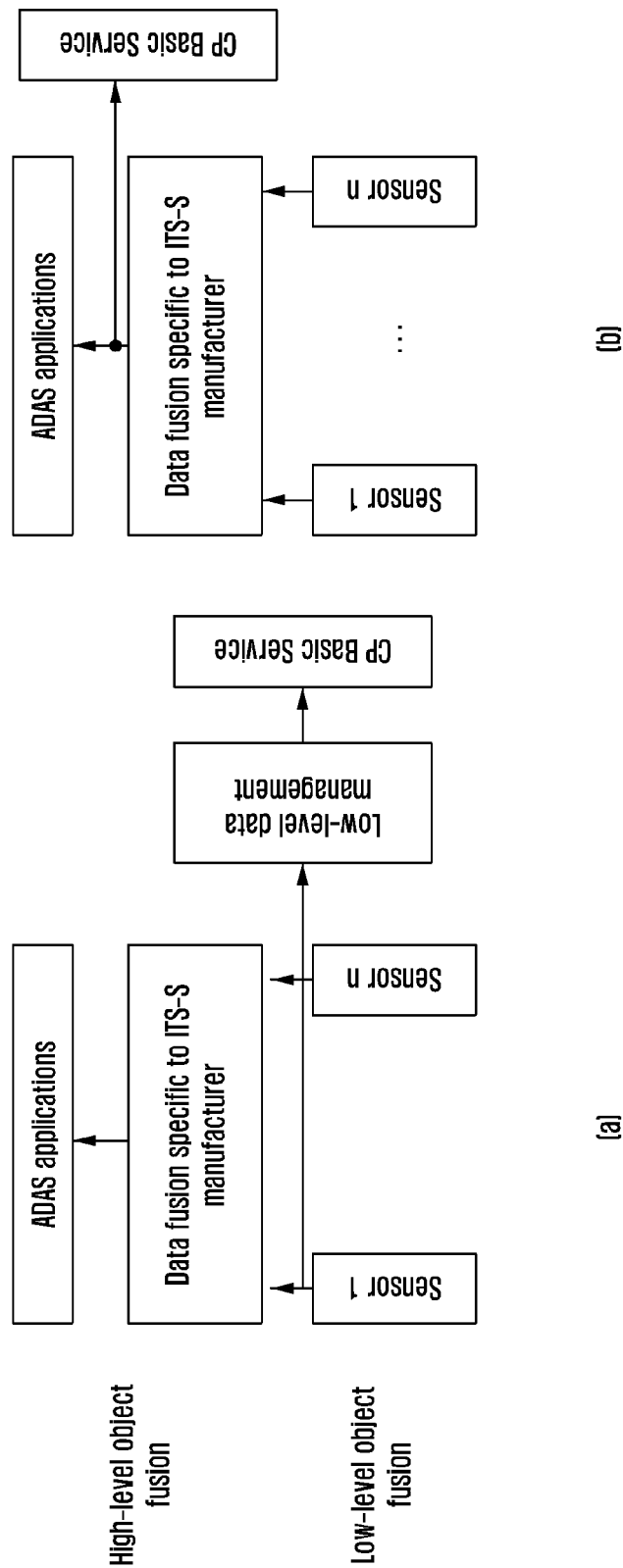
FIG. 3 schematically depicts abstract object data extraction levels to be considered as part of the CP basic service.
Figure 4:
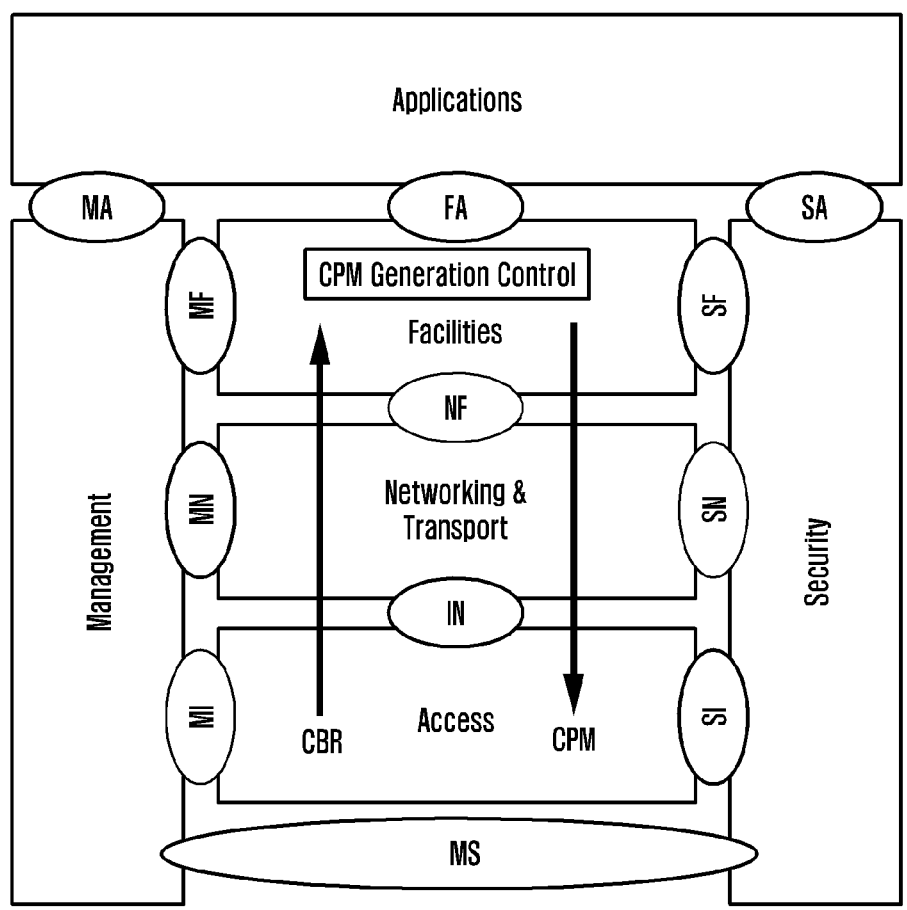
FIG. 4 schematically depicts a method of CPM generation based on measured Channel Busy Ratio (CBR) in Intelligent Transport System (ITS) station reference architecture.
Figure 5:
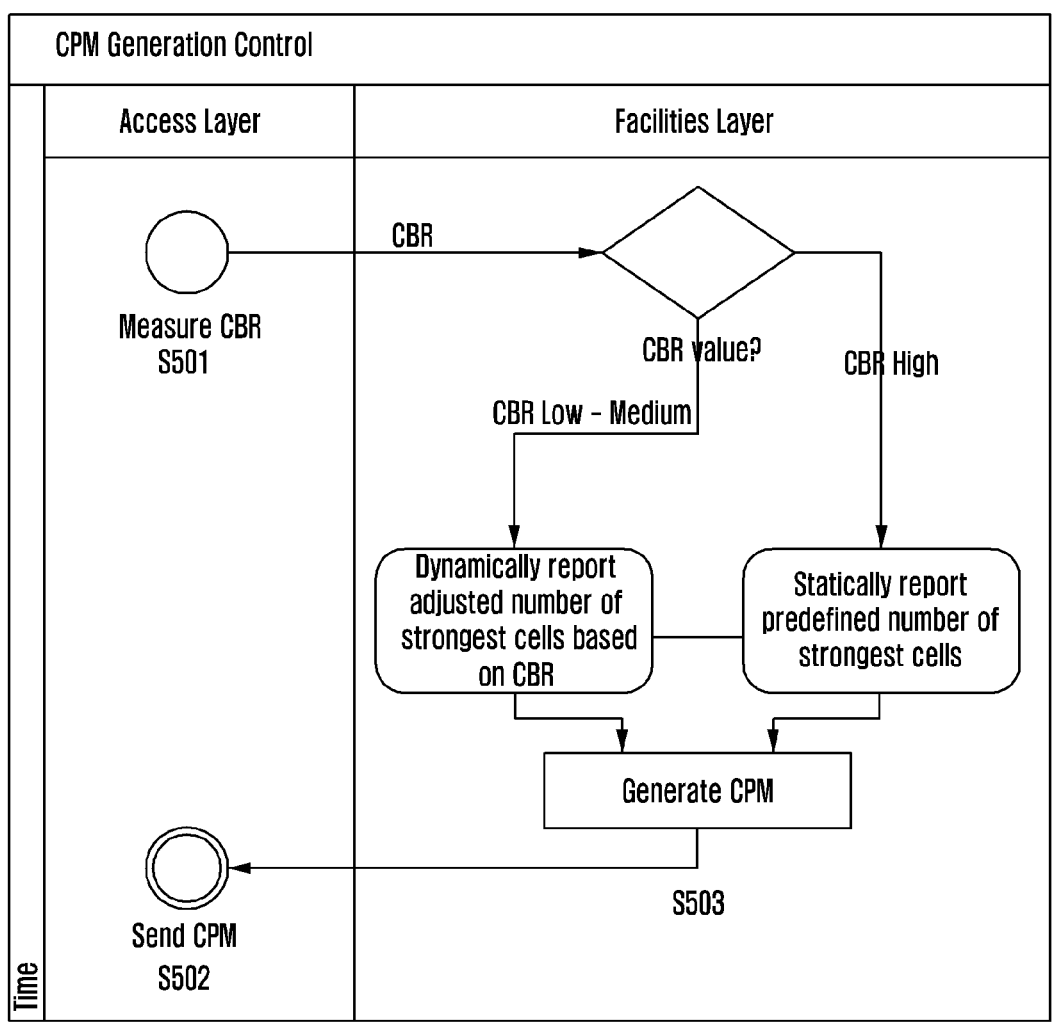
FIG. 5 schematically depicts a method of controlling a network according to an exemplary embodiment.
Figure 8:
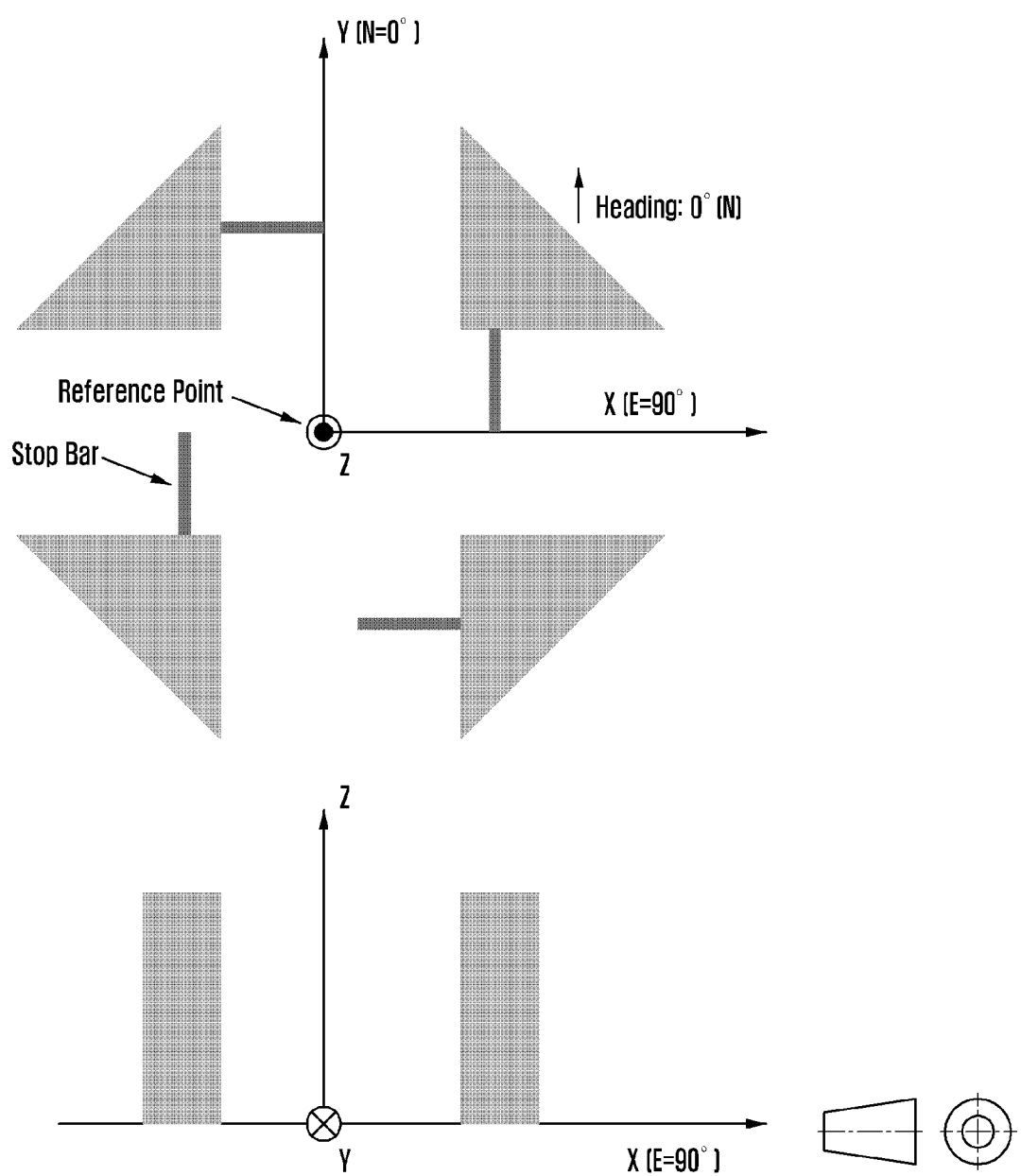
FIG. 8 schematically depicts a coordinate system to be used for Road Side Unit (RSU) as disseminating ITS-S.
Figure 9:
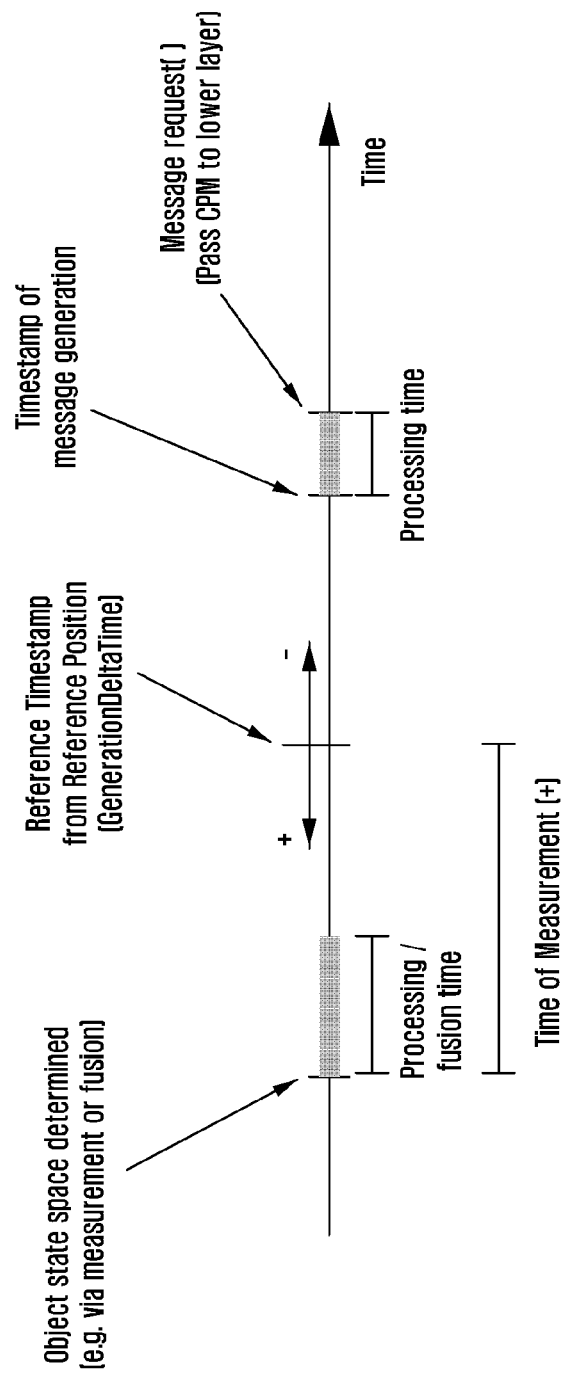
FIG. 9 schematically depicts transmitter-side for computing Time of Measurement.
Figure 11:
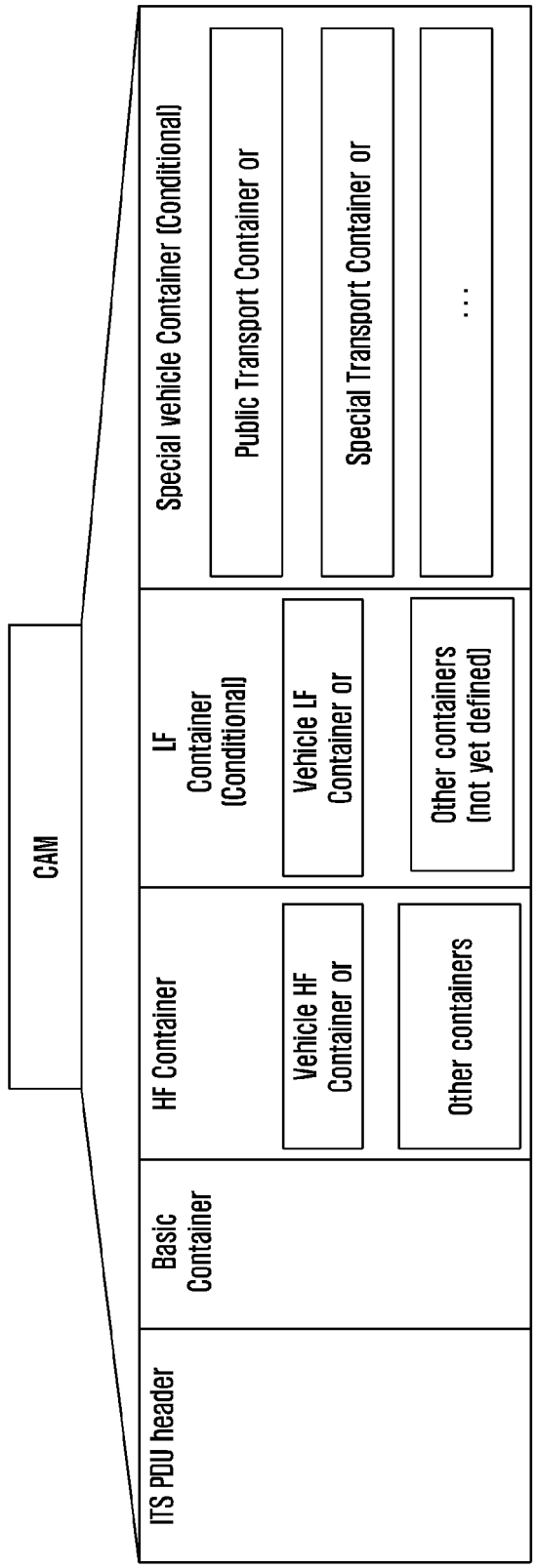
FIG. 11 schematically depicts a Cooperative Awareness Message (CAM) structure.
Figure 12:
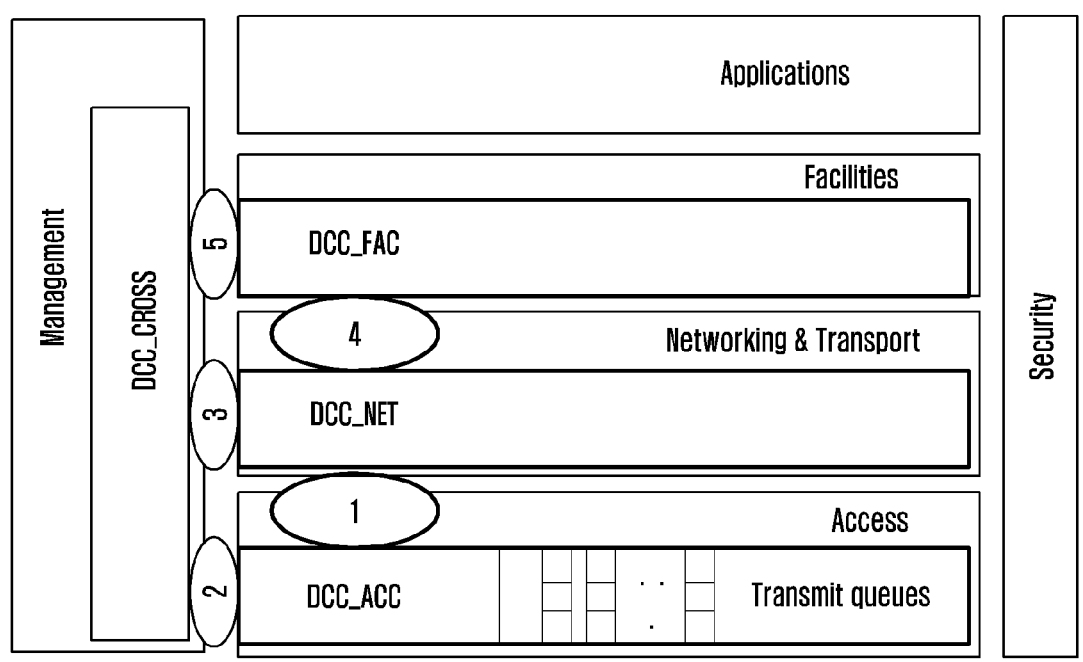
FIG. 12 schematically depicts decentralized congestion control (DCC) architecture.
Figure 13:
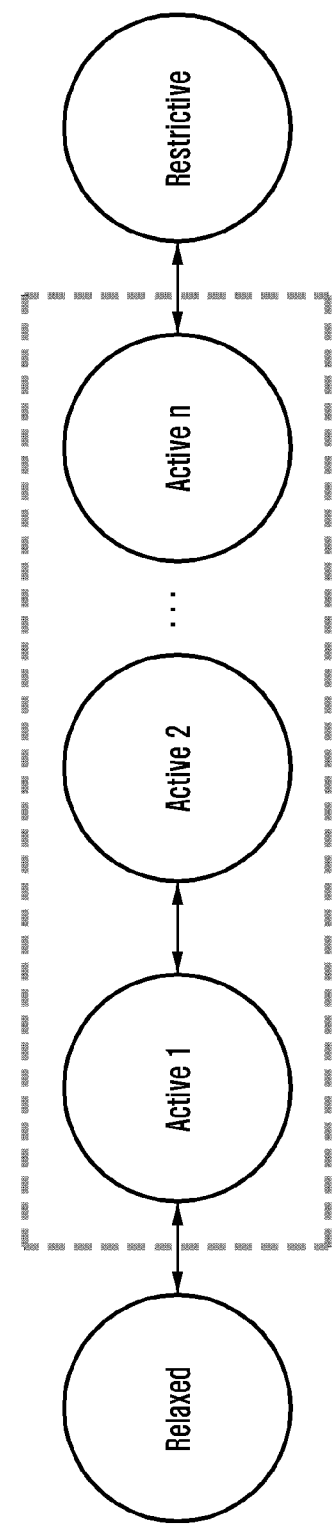
FIG. 13 schematically depicts a DCC reactive approach.
Figure 14:
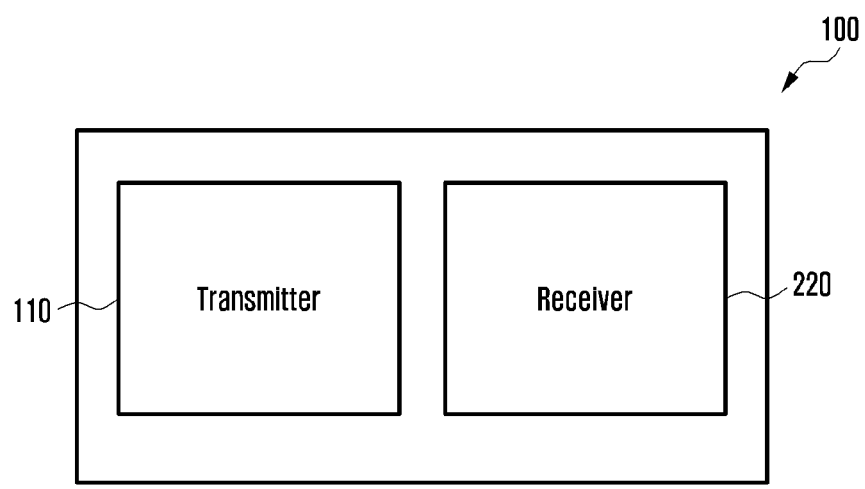
FIG. 14 schematically depicts a user equipment, UE, device according to an exemplary embodiment of the invention.

For a better understanding of the invention, and to show how exemplary embodiments of the same may be brought into effect, reference will be made, by way of example only, to the accompanying diagrammatic Figures, in which:

FIG. 1 schematically depicts a method of controlling a network according to an exemplary embodiment;

FIG. 2 schematically depicts a Cooperative Perception Message (CPM) protocol data unit (PDU);

FIG. 3 schematically depicts abstract object data extraction levels to be considered as part of the CP basic service;

FIG. 4 schematically depicts a method of CPM generation based on measured Channel Busy Ratio (CBR) in Intelligent Transport System (ITS) station reference architecture;

FIG. 5 schematically depicts a method of controlling a network according to an exemplary embodiment;

FIG. 6 schematically depicts a C-V2X protocol stack;

FIG. 7 schematically depicts a coordinate system to be used for vehicle as disseminating ITS-S;

FIG. 8 schematically depicts a coordinate system to be used for Road Side Unit (RSU) as disseminating ITS-S;

FIG. 9 schematically depicts transmitter-side for computing Time of Measurement;

FIG. 10 schematically depicts a coordinate system for detected object for vehicle in disseminating ITS-S;

FIG. 11 schematically depicts a Cooperative Awareness Message (CAM) structure;

FIG. 12 schematically depicts decentralized congestion control (DCC) architecture;

FIG. 13 schematically depicts a DCC reactive approach;

FIG. 14 schematically depicts a user equipment, UE, device according to an exemplary embodiment of the invention.

FIG. 1 schematically depicts a method of controlling a network, for example a peer-to-peer network, according to an exemplary embodiment.

At S101, a first channel load metric, for example a channel busy ratio, CBR, of a set of channel load metrics of a first channel of a set of channels of the network is determined, for example by the first UE.

At S102, a first message, for example a V2X message, of a set of messages is generated, by the first UE, according to the determined first channel load metric.

At S103, the generated first message is transmitting by the first UE, optionally on the first channel.

The method may include any of the steps described herein with reference to the first aspect.

CPM Object Quality Assessment and Object Inclusion

FIG. 2 schematically depicts a Cooperative Perception Message (CPM) protocol data unit (PDU).

Objects to be included in the CP message shall be shared with other ITS-Ss with the objective of increasing traffic safety. Shared objects are therefore used by safety applications on receiving ITS-S. Objects relevant for traffic safety are either static, i.e. do not move but are located on the driving lanes, or dynamic, i.e. move or have the ability to move. The objective of transmitted objects as part of the CP Message is not to share and to compare traffic-regulation information such as traffic signs and traffic light information. Instead, data about objects which cannot be available to other ITS-Ss as their presence is only temporary (e.g. traffic participants or temporary obstacles) need to be given priority.

Consequently, the following criteria have to be fulfilled by objects prior to being included in the CP Message:
  Objects have to be located on the driving or adjacent lanes (e.g. pedestrian walks). Map matching algorithms on the disseminating ITS-Ss may be used for determining whether an object is located on a lane;
  Objects which do not move (i.e. are stationary) and which can be classified by the disseminating station into the categories.

As shown in FIG. 2, the ITS PDU header is a common header that includes the information of the protocol version, the message type and the ITS-S ID of the originating ITS-S.

Regardless of which type of ITS-S disseminates a CPM, the Management Container provides information regarding the Station Type and the Reference Position of the ITS-S.

The message can be disseminated either by a moving ITS-S, such as a vehicle, or by a stationary RSU.

In case of a CPM generated by a vehicle, the Station Data Container contains the dynamic information of the originating ITS-S. It is not optional in case of a vehicle disseminating the CPM.

In case of a CPM generated by a RSU, the Originating RSU Container may provide references to identification numbers provided by a MAP Message disseminated be the same RSU. These references are required in order to match data provided by the CPM to the geometry of an intersection or road segment as provided by the MAP message. It is not required that a RSU has to transmit a MAP message for matching objects to road geometries. In this case, the Station Data Container may be omitted. It is for this reason that the Station Data Container is set as optional.

The optional Sensor Information Container represents an option to also provide information about the sensory capabilities of an ITS-S. Depending on the station type of the originating ITS-S, different container specifications are available to encode the properties of a sensor. The Sensor Information Containers are attached at a lower frequency than the other containers. Up to ten containers of this type may be added.

An optional Perceived Object Container is added for every object that has been perceived by an ITS-S. It provides information about the detected object with respect to the disseminating station. Classifications and positions matched to road data can also be provided. This container type is only added if objects have been detected according to the inclusion rules.

Each container is composed of a sequence of optional or mandatory data elements (DEs) and/or data frames (DFs). DEs and DFs are mandatory unless specified otherwise. The present document provides CPM content specifications for vehicle and RSU ITS-Ss.

Decentralized Congestion Control

Decentralized congestion control (DCC), as described in ETSI EN 302 571 V2.1.1, is a mandatory mechanism to be used by the equipment using the access layer technology based on IEEE 802.11-2012 to ensure that the radio channel is not congested by too many transmissions within a certain geographical range. The mechanism is such that the equipment adapts its transmission behaviour dynamically based on how occupied the channel is at the moment.

CPM Object Extraction

FIG. 3 schematically depicts abstract object data extraction levels to be considered as part of the CP basic service.

For objects to be transmitted, the requirements of the applications taking received remote objects into account need to be considered. Therefore, a common assessment criteria regarding object quality needs to be applied.

The source of the sensor data to be transmitted as part of any CP message needs to be selected in accordance with the requirements of a prospective data fusion process on the receiving ITS-S. The object list (track list) provided by the ITS-S's environment model has been subjected to several low-pass filters and prediction models. Hence, simply transmitting the data from this object list results in a substantial prediction error and filter cascades within a receiving ITS-S's environment model.

Therefore, the data transmitted should be as close to the original sensor data as possible. However some receiving ITS-Ss may not be able to process such a raw data; these ITS-Ss require a processed data (descriptions of the detected objects). Moreover, simply transmitting the original sensor data, e.g. raw data, is also not a viable solution, as this imposes very high requirements regarding data rates and transmission frequencies. Nevertheless, if the channel resource permits, the transmitting ITS-S may attach the raw data to the CPM, which contains the processed data.

FIG. 3 possible implementations for selecting the data to be transmitted as part of the CPM. FIG. 3(a) depicts the preferred implementation, where sensor data is taken from different sensors and processed as part of a low-level data management entity. This entity is responsible for calculating the plausibility of the detected objects as well as for selecting the object data to be inserted as part of the next CPM. In setup (a), filter cascades are avoided, as a high-level fusion process has to be performed by the receiving ITS-Ss.

FIG. 3(b) on the other hand depicts an implementation in which the object list provided by the data fusion process specific to an ITS-S manufacturer is transmitted as part of the CPM. This implementation is not preferred, as differing data fusion processes might be implemented by different ITS-S manufacturers. Consequently, covariance matrices have different meanings depending on the data fusion process.

Regardless of the type of implementation, whenever an object has been detected by the sensors of an ITS-S, its plausibility needs to be calculated as detailed in [i.16]. In case the plausibility of the object exceeds a given threshold PLAUS_OBJ, it shall be considered for transmission, in case:
- the absolute difference between the current yaw-angle of the detected object and the yaw-angle included in the CPM previously transmitted by the originating ITS-S exceeds 4°;
- the relative distance between the current position of the originating ITS-S and the detected object compared to the relative distance between the originating ITS-S and the detected object included in the CPM previously transmitted by the originating ITS-S exceeds 4 m;
- the absolute difference between the current speed of the detected object and the speed included in the CPM previously transmitted by the originating ITS-S exceeds 0.5 m/s.

FIG. 4 schematically depicts a method of CPM generation based on measured Channel Busy Ratio (CBR) in Intelligent Transport System (ITS) station reference architecture.

FIG. 5 schematically depicts a method of controlling a network according to an exemplary embodiment.

To better control radio resources usage and avoid channel congestion in V2X, it is proposed to implement the following dynamic Cooperative Perception Service sensor and objects container control (see sensor information and perceived object container in FIG. 2) in the transmitting V2X UE facilities layer (generating CPMs) based on the locally measured CBR value (see FIGS. 3 and 4):

a) Low-Medium CBR value—Dynamically adjust message size and report measurements of strongest cells with their identifiers limiting their number based on the increasing radio channel occupancy (Channel Busy Ratio) between predefined maximum (e.g. 96 cells in LTE) and minimum (e.g. 3 cells) values. Alternative approach is to further limit the amount of the cells reported in V2X message, only include cells if its absolute measured power (LTE RSRP) or quality (LTE RSRQ) changed by more than x dB or dBm with respect to the last transmission.

b) High CBR value—Statically report measurements of predefined number (e.g. 3) of strongest cells with their unique identifiers (e.g. EUTRAN frequency and physical cell id in LTE)

That is, FIG. 5 schematically depicts a method of controlling the network, for example a peer-to-peer network, comprising a set of user equipment, UE, devices, including a first UE, the method comprising:

determining, by the first UE, a first channel load metric, for example a channel busy ratio, CBR, of a set of channel load metrics of a first channel of a set of channels of the network (S501);

generating, by the first UE, a first message, for example a V2X message, of a set of messages according to the determined first channel load metric (S502); and transmitting, by the first UE, the generated first message, optionally on the first channel (S503).

In this example, the determining the first channel load metric comprises measuring, by the first UE, the first channel load metric, for example a CBR.

In this example, the first channel comprises and/or is a control channel, a common channel, a service channel, a safety channel and/or a signalling channel.

In this example, the generating, by the first UE, the first message comprises selectively generating the first message.

In this example, the generating, by the first UE, the first message comprises selectively generating the first message if the first channel load metric is within a first predetermined range of a set of predetermined ranges (i.e. low or medium, for example according to $0 \leq CBR \leq 0.3$—Low; $0.3 < CBR \leq 0.65$—Medium; $0.65 < CBR \leq 0.8$—High (congested channel); $0.8 < CBR \leq 1$—Very high (very congested channel)).

In this example, the generating, by the first UE, the first message comprises reporting a number N of strongest cells (i.e. between 3 and 96).

In this example, the reporting the number N of strongest cells comprises dynamically reporting the number N, for example an adjusted number N, of strongest cells based on the first channel load metric, if the first channel load metric is within the first predetermined range and/or at most the first threshold of a set of threshold (i.e. between 3 and 96).

In this example, the reporting the number N of strongest cells comprises statically reporting the number N, for example predefined number N (i.e. for example 3), of strongest cells, if the first channel load metric is outside the first predetermined range (i.e. high, for example according to $0 \leq CBR \leq 0.3$—Low; $0.3 < CBR \leq 0.65$—Medium; $0.65 < CBR \leq 0.8$—High (congested channel); $0.8 < CBR \leq 1$—Very high (very congested channel)).

In this example, the generating, by the first UE, the first message comprises controlling a size of the first message, optionally based, at least in part, on the first channel metric.

In this example, the controlling the size of the first message comprises including and/or excluding message content therein.

In this example, the controlling the size of the first message comprises classifying a relevance of the message content and including and/or excluding the message content is based, at least in part, on a result of the classifying.

C-V2X Protocol Stack

FIG. 6 schematically depicts a C-V2X protocol stack.

In more detail, in C-V2X in parallel to Uu interface, a sidelink (PC5) interface is available for direct vehicle UE to UE communication. To allow advance notification (prediction) of mobile network coverage change in vehicle UE, the RRC protocol cell measurement reporting mechanism may be extended to the sidelink PC5 interface used in C-V2X direct communications between vehicles. As a result, existing measurements events (defined to the measured serving cell or neighbour cells quantities) may be used to preconfigure, trigger and report observed mobile radio signal coverage changes by the vehicle to the locally surrounding vehicles. There may be also some new type of events defined specific for PC5 interface and more suitable for C-ITS applications.

Measurement events triggering in the vehicle UE may be preconfigured by:

1. The mobile NW (as in legacy RRC) on Uu interface i.e. by usage of broadcasted system information mechanism in a cell or UE dedicated signalling.

2. Other vehicle(s) on PC5 interface. This may require bidirectional coordination between communicating V2X devices and extension of the existing RRC measurement configuration and reporting procedure to sidelink. As a variant of this approach, a client-server architecture with an event subscription based mechanism could be used e.g. the event reporting vehicle is a server and receiving vehicles are clients subscribing to the information on specific event being triggered in the server.

3. A road side (infrastructure) unit—static element enabling communication for road infrastructure elements e.g. traffic lights, gantries etc.

4. Other means—local SIM card memory or dedicated server infrastructure owned by the vehicle manufacturer or mobile network operator.

Triggered measurement event information may be transmitted to surrounding vehicles in:

1. In the C-V2X radio access protocol stack. Particularly, Radio Resource Control layer messages may be extended to PC5 interface e.g. similar message to the existing RRC MeasurementReport message may be defined on sidelink. Because RRC protocol currently does not support operation vehicle information (location, speed, heading), the information about a triggered radio coverage event would need to be combined with this information typically available in higher protocol layers.

2. Above the C-V2X radio access protocol stack, for example, by extending the Application or Facility layer, protocol messages (e.g. V2V CAM (EU) or BSM (US)) or by creating new types of message specific for measurement reporting on PC5 interface. The advantage of this approach is the fact that CAM and BSM messages already include operational vehicle information (e.g. vehicle type, speed, location, acceleration, heading, physical vehicle parameters) to support C-ITS applications.

To allow sharing and combing the information about radio coverage changes with operational vehicle information, some cross layer information exchange would be required (e.g. via API programming interface). In the receiving V2X system, triggered measurement event information combined with source vehicle location and moving direction (this information is already available in V2V CAM (EU) or BSM (US) messages) enables receiving vehicles predict network coverage changes.

Originating Vehicle Container

FIG. 7 schematically depicts a coordinate system to be used for vehicle as disseminating ITS-S.

An Originating Vehicle Container comprises information about the dynamics of the vehicle disseminating the CPM. It shall be included in every CPM transmitted by a vehicle originating station ITS-S. Such information is required to transform objects described in the Perceived Object Container of the same CPM into a target reference frame, such as a vehicle centered coordinate system as shown in FIG. 7.

The Originating Vehicle Container provides information which seem to a certain extent redundant to the Basic Vehicle Container High Frequency included in a CA message which will also be transmitted by the same ITS-S. It is assumed that an ITS-S receiving a CPM from the originating station, also receives a CAM from the same ITS-S. However, due to the delay between the reception of a CPM and a previous CAM, vehicle dynamics variables need to be extrapolated, which comes at the cost of increasing the inaccuracy of successive coordination transformation processes. Furthermore, the Originating Vehicle Container provides additional parameters which are not provided by the CA message. These optional parameters are the Vehicle Orientation Angle, Pitch Angle, Roll Angle, Vehicle Height and Trailer Data. Those parameters are used for providing the actual geometric dimensions of the originating ITS-S, optionally in a three-dimensional fashion (Roll, yaw, pitch) which are not provided by the CA message. The Vehicle Orientation Angle provides means to transmit the actual orientation of the vehicle opposed to the vehicle heading which references the orientation of the provided speed vector magnitude only.

Originating RSU Container

FIG. 8 schematically depicts a coordinate system to be used for Road Side Unit (RSU) as disseminating ITS-S.

In case the originating ITS-S is an RSU, the Station Data Container contains the Originating RSU Container, which includes two parameters to reference information received by the MAP message. Both, the Intersection Reference ID and Road Segment ID are optional parameters that can be used to refer to the road infrastructure provided by the road lane topology (RLT) service. It is therefore required for the RSU to also transmit a MAP message which is referenced by the CPM either of the two variables stated before. In case of RSUs disseminating the CPM, the reference position shall refer to the reference position, e.g. an arbitrary point on the intersection, as shown in FIG. 8.

Perceived Object Container

FIG. 9 schematically depicts transmitter-side for computing Time of Measurement.

FIG. 10 schematically depicts a coordinate system for detected object for vehicle in disseminating ITS-S.

Whenever an object is detected by a disseminating ITS-S, a Perceived Object Container may be added to the CPM. The container enables a detailed description of the dynamic state and properties of a detected object. The information regarding the location and dynamic state of the perceived object are provided in a coordinate system, as shown in FIG. 7.

In case of a vehicle sharing information about a detected object, FIG. 7 depicts the coordinate system that shall be used for the description of the object's state variables.

In case of RSUs disseminating the CPM, the reference position shall refer to the reference position, e.g. an arbitrary point on the intersection, as depicted in FIG. 8.

Every object has to be described by at least providing the distance and speed in the x/y plane of the respective coordinate system with respect to a station's reference point, as shown in FIG. 10 for the case of a vehicle as disseminating ITS-S. The reference point of a measurement is also provided as part of the message.

Furthermore, an objectID is assigned to each detected object. This ID is taken from a range of monotonously increasing numbers and is maintained per object, as long as an object is perceived and new sensor measurements are assigned to the object. The range of possible objectIDs is between 0 and 255. As soon as objectID 255 has been assigned to an object, the next object gets assigned ID 0 in a round-robin fashion.

A time of measurement is provided for each object which is the time difference for the provided measurement information with respect to the generation delta time stated in the management container. FIG. 9 provides an interpretation for the time of measurement which is always relative to the GenerationDeltaTime encoded in the message and the timestamp which corresponds to when the state space information about a detected object is made available. The GenerationDeltaTime always corresponds to the latest point in time when the latest reference position is available on the transmitting side. Upon receiving the message, the receiver has to compute its own local GenerationDeltaTime based on its current absolute timestamp. The difference between the encoded GenerationDeltaTime in the received CPM and the local GenerationDeltaTime then represents the age of the CPM. The received encoded Time of Measurements then need to be added to the age of the CPM to compute the age of the encoded object. Positive Time of Measurements thereby indicate that the Time of Measurement needs to be added to the message age on the receiver side, as the state space of the object has been created before the transmitter's GenerationDeltaTime and is therefore older. Negative time values indicate that the time of measurement needs to be subtracted from the age of the CPM as the state space of the described object has been determined after the transmitter's GenerationDeltaTime has been created. The Time of Measurement may therefore include any processing time of a sensor or data fusion system. In case the fused object state information is transmitted, the time of measurement shall reference the point in time to which the state space has been predicted.

The classification of each object is a mandatory field.

Several optional fields are available, to provide a more detailed description of a perceived object. Distance, Speed and Acceleration values can be provided in three dimensions along with the yaw angle of the object. Furthermore, a three-dimensional description of an object's geometric extension can be provided. A RSU is also able to provide a map-matching result for a particular object with respect to the MAP information.

Cooperative Awareness Message

FIG. 11 schematically depicts a Cooperative Awareness Message (CAM) structure.

Particularly, FIG. 11 shows a general CAM structure. CAM data elements and size are described in Table 2. The vehicle High Frequency (HF) container contains fast-changing status information such as heading or speed. The Low Frequency (LF) container contains static or slow-changing vehicle data like exterior lights status and path history.

TABLE 2

CAM Data Elements and sizes

| Data Elements | Type | Typical Size (Bytes) | Description |
|---|---|---|---|
| ITS PDU Header | Mandatory | 8 | Protocol version, message type, sender address, and time stamp |
| Basic Container | Mandatory | 18 | Station type (e.g., lightTruck, cyclist, pedestrians, etc.) and position |
| High-Frequency (HF) Container | Mandatory | 23 | All fast-changing status information of the vehicle, i.e., heading, speed, acceleration, etc. |
| Low-Frequency (LF) Container | Mandatory (every 500 ms) | 60 (7 path history points) | Static or slow-changing vehicle data, mainly path history. The path history is made up of a number of path history points. Typically, 7 path history points are sufficient to cover over 90% cases based on extensive testing whereas up to 23 path history points can be contained. Each point is approximately 8 bytes [1]. |
| Special Vehicle Container | Optional | 2~11 | Specific vehicles role in road traffic (e.g., public transport, vehicles realizing a rescuing operation, etc.). |

FIG. 11 schematically depicts a user equipment, UE, device 100 according to an exemplary embodiment of the invention.

The UE device 100 is arranged to determine first message related to a network and corresponding second information related to the UE and transmit the first message and the corresponding second information.

Optionally, the UE device 100 is arranged to identify a first event amongst a set of events and transmit first message related to the identified first event, as described herein.

In this example, UE 100 comprises and/or is a transmitter device, comprising a transmitter 110. In this example, UE 100 supports V2X communication for vehicle-to-vehicle (V2V), vehicle-to-infrastructure (V2I), and vehicle-to-pedestrian (V2P) communication. For example, the UE 100 may be included in a vehicle, infrastructure or a VRU device. The UE 100 controls the transmitter 110 to transmit according to communication protocols used in C-ITS. The transmitter 110 is a wireless transmitter using C-V2X (LTE-V2X or NR-V2X standards) radio access technology on PC5 and Uu interface.

Decentralized Congestion Control

ETSI EN 102 687 V1.2.1 describes decentralized congestion control (DCC) algorithms set out in ETSI EN 302 571 and ETSI TS 103 175.

FIG. 12 schematically depicts decentralized congestion control (DCC) architecture. The architecture includes the following DCC components:
DCC_ACC located in the access layer;
DCC_NET located in the networking & transport layer;
DCC_FAC located in the facilities layer; and
DCC_CROSS located in the management layer.

The DCC_ACC component is specified in the present document and belongs to a DCC framework covering all parts of the architecture. The DCC_ACC component provides the local channel busy ratio (CBR) value to the DCC algorithm. If information sharing for DCC is supported through ETSI TS 102 636-4-2, then the global CBR, CBR_G, value shall be used.

Different techniques exist for controlling the network load:
Transmit power control (TPC);
Transmit rate control (TRC); and/or
Transmit datarate control (TDC).

One or more of these techniques may be combined by the DCC algorithm for controlling the network load.

TPC: In TPC, the output power is altered to adjust the current channel load. For example, during high utilization periods the ITS-S can reduce its output power and thereby, is a reduction in interference range achieved. This results in that ITS-Ss further away will experience a reduced CBR.

TRC: TRC regulates the time between two consecutive packets from an ITS-S. During high utilization periods, the TRC increases the time between two packets for the ITS-S, Toff time.

TDC: TDC is a mechanism that can be used by wireless systems offering several transfer rate options. During high utilization periods and depending on application, a higher transfer rate can be used to decreased the Ton time.

Reactive and adaptive DCC algorithms

An introduction to reactive and adaptive DCC algorithms is provided in Annex C of ETSI TS 103 175 and Annex A of ETSI TR 101 612.

FIG. 13 schematically depicts a DCC reactive approach.

The reactive approach consists of several states reached depending on the current CBR. The evaluation of state is performed every TCBR. Every state can control the network load using one or a combination of the techniques described in clause 5.1. One state can only be reached by a neighbouring state. For example, the "Active 1" state in FIG. 2 can only be reached by the "Relaxed" state and the "Active 2" state.

Increased CBR value implies higher network utilization resulting in fewer transmission opportunities for the ITS-S with possible less output power and similar. Restrictive state is the most stringent in terms of transmission opportunities and relaxed state can in essence be restricted by the limits in ETSI EN 302 571.

In the adaptive approach, at every time when UTC modulo 200 ms is zero the following steps shall be executed:

Step 1:

$$\text{CBR}_{\text{ITS-}S} = 0.5 \times \text{CBR}_{\text{ITS-}S} + 0, \times ((CBR\_L\_0\_Hop + CBR\_L\_0\_Hop \text{ Previous})/2) \quad (1)$$

NOTE 1: If information sharing is supported via ETSI TS 102 636-4-2, then CBR_G is substituted for CBR_L_0_Hop is exchanged with. CBR_G Previous is substituted for CBR_L_0_Hop Previous.

Step 2:

If sign(CBRtarget−CBRITS-S) is positive then
$$\delta offset = \min(\beta \times (CBRtarget - CBRITS\text{-}S), G_{max}^+); \quad (2)$$

Else $offset = \max(\beta \times (CBRtarget - CBRITS\text{-}S), G_{max}^-) \quad (3)$ Step 3:

$$\delta = (1-\alpha) \times \delta + offset \quad (4)$$

Step 4:

If $\delta > \delta max, \delta = max$ (5)

Step 5:

If $\delta < \delta min, \delta = \delta min$ (6)

where:
CBR_L_0_Hop Local channel busy ratio for a specific frequency channel for ego ITS station
CBR_G Global channel busy ratio for a specific frequency channel
CBR_L_0_Hop Previous the second most recent CBR_L_0_Hop
CBR_G Previous the second most recent CBR_G
CBRITS-S moving average of measured CBR values
CBRtarget control parameter
$G_{max}^+$ control parameter
$G_{max}^-$ control parameter
TCBR period of time
Ton duration of a transmission
Ton_pp duration of the previous transmission
Toff minimum time between two transmissions
δ Ton/(Ton+Toff)
α control parameter
β control parameter
δmax maximum value of δ
δmin minimum value of δ
δoffset offset value of δ
t current system time
tgo time when gate keeper opens
tpg time when the gate keeper closes The parameter δ is a unitless value that represents the maximum fraction of time that this ITS-S is allowed to transmit on the wireless medium, over any given interval. For example, if δ=0,01, the aggregate of all transmissions from this ITS-S are allowed to occupy the medium up to 1% of the time. When considering an interval of one second, δ represents an upper bound on the permitted duty cycle.

FIG. 14 schematically depicts a user equipment, UE, device 100 according to an exemplary embodiment.

The UE device 100 is arranged to:
determine a first channel load metric, for example a channel busy ratio, CBR, of a set of channel load metrics of a first channel of a set of channels of the network;
generate a first message, for example a V2X message, of a set of messages according to the determined first channel load metric; and
transmit, by the first UE, the generated first message, optionally on the first channel.

Optionally, the UE device 100 is arranged to receive a transmitted first message.

In this example, UE 100 comprises and/or is a transceiver device, comprising a transmitter 110 and a receiver 220. In this example, UE 100 supports V2X communication for vehicle-to-vehicle (V2V), vehicle-to-infrastructure (V2I), and vehicle-to-pedestrian (V2P) communication. For example, the UE 100 may be included in a vehicle, infrastructure or a VRU device. The UE 100 controls the receiver 220 to receive according to communication protocols used in C-ITS. The receiver 220 is a wireless receiver using LTE-V2X or NR-V2X standards.

Although a preferred embodiment has been shown and described, it will be appreciated by those skilled in the art that various changes and modifications might be made without departing from the scope of the invention, as defined in the appended claims and as described above.

Attention is directed to all papers and documents which are filed concurrently with or previous to this specification in connection with this application and which are open to public inspection with this specification, and the contents of all such papers and documents are incorporated herein by reference.

All of the features disclosed in this specification (including any accompanying claims and drawings), and/or all of the steps of any method or process so disclosed, may be combined in any combination, except combinations where at least some of such features and/or steps are mutually exclusive.

Each feature disclosed in this specification (including any accompanying claims, and drawings) may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of the foregoing embodiment(s). The invention extends to any novel one, or any novel combination, of the features disclosed in this specification (including any accompanying claims and drawings), or to any novel one, or any novel combination, of the steps of any method or process so disclosed.

New radio (NR) targets a wide range of use cases in 5G. The application of a high-altitude platform station (HAPS) and satellite nodes in NR can be important components of 5G. The deployment of non-terrestrial networks (NTNs) raises different issues to deployment of terrestrial.

The invention claimed is:

1. A method performed by a first intelligent transport systems station (ITS-S), the method comprising:
generating a collective perception message (CPM) including information on one or more objects selected from a plurality of perceived objects, and
transmitting, to a second ITS-S, the CPM,
wherein the one or more objects include a first object selected based on a difference between a current speed of the first object and a previous speed of the first object previously included in a CPM exceeding a first threshold or a second object selected based on a distance between a current position of the second object and a previous position of the second object previously included in a CPM exceeding a second threshold, and
wherein a time elapsed between two consecutive CPM generations is greater than or equal to a minimum threshold and less than or equal to a maximum threshold.

2. The method of claim 1,
wherein the first threshold is 0.5 meters per second (m/s) and the second threshold is 4 meters (m).

3. The method of claim 1,
wherein the CPM is generated in case that a new object is detected.

4. The method of claim 1,
wherein the minimum threshold is 200 milliseconds (ms) and the maximum threshold is 1000 ms, wherein the CPM is generated periodically, and
wherein a generation frequency of the CPM is determined by a dynamic behavior of a detected object status.

5. The method of claim 4,
wherein the dynamic behavior is associated with a change of a position of a detected object, a change of a speed of the detected object, and a change of a direction of the detected object.

6. The method of claim 1,
wherein the one or more objects further includes a third object selected based on a time associated with the third object.

7. A method performed by a second intelligent transport systems station (ITS-S), the method comprising:
receiving, from a first ITS-S, a collective perception message (CPM) including information on one or more objects selected from a plurality of perceived objects, and
identifying statuses of the one or more objects based on the CPM,
wherein the one or more objects include a first object selected based on a difference between a current speed of the first object and a previous speed of the first object previously included in a CPM exceeding a first threshold or a second object selected based on a distance between a current position of the second object and a previous position of the second object previously included in a CPM exceeding a second threshold, and
wherein a time elapsed between two consecutive CPM generations is greater than or equal to a minimum threshold and less than or equal to a maximum threshold.

8. The method of claim 7,
wherein the CPM is used by the second ITS-S to increase safety situations.

9. The method of claim 7,
wherein the first threshold is 0.5 meters per second (m/s) and the second threshold is 4 meters (m).

10. The method of claim 7,
wherein the CPM includes information on a new object newly detected by the first ITS-S.

11. A first intelligent transport systems station (ITS-S) comprising:
a transceiver; and
a controller configured to:
generate a collective perception message (CPM) including information on one or more objects selected from a plurality of perceived objects, and
transmit, to a second ITS-S, the CPM,
wherein the one or more objects include a first object selected based on a difference between a current speed of the first object and a previous speed of the first object previously included in a CPM exceeding a first threshold or a second object selected based on a distance between a current position of the second object and a previous position of the second object previously included in a CPM exceeding a second threshold, and
wherein a time elapsed between two consecutive CPM generations is greater than or equal to a minimum threshold and less than or equal to a maximum threshold.

12. The first ITS-S of claim 11,
wherein the first threshold is 0.5 meters per second (m/s) and the second threshold is 4 meters (m).

13. The first ITS-S of claim 11,
wherein the CPM is generated in case that a new object is detected.

14. The first ITS-S of claim 11,
wherein the CPM is generated periodically,
wherein a generation frequency of the CPM is determined by a dynamic behavior of a detected object status, and
wherein the dynamic behavior is associated with a change a position of a detected object, a change of a speed of the detected object, and a change of a direction of the detected object.

15. A second intelligent transport systems station (ITS-S) comprising:
a transceiver; and
a controller configured to:
receive, from a first ITS-S, a collective perception message (CPM) including information on one or more objects selected from a plurality of perceived objects, and
identify statuses of the one or more objects based on the CPM,
wherein the one or more objects include a first object selected based on a difference between a current speed of the first object and a previous speed of the first object previously included in a CPM exceeding a first threshold or a second object selected based on a distance between a current position of the second object and a previous position of the second object previously included in a CPM exceeding a second threshold, and
wherein a time elapsed between two consecutive CPM generations is greater than or equal to a minimum threshold and less than or equal to a maximum threshold.

16. The second ITS-S of claim 15,
wherein the CPM is used by the second ITS-S to increase safety situations.

* * * * *